United States Patent [19]
Rudish et al.

[11] Patent Number: 6,104,346
[45] Date of Patent: Aug. 15, 2000

[54] ANTENNA AND METHOD FOR TWO-DIMENSIONAL ANGLE-OF-ARRIVAL DETERMINATION

[75] Inventors: Ronald M. Rudish, Commack; Edward Magill, Brooklyn, both of N.Y.

[73] Assignee: AIL Systems Inc., Deer Park, N.Y.

[21] Appl. No.: 09/226,422

[22] Filed: Jan. 6, 1999

Related U.S. Application Data

[60] Provisional application No. 60/107,476, Nov. 6, 1998.

[51] Int. Cl.[7] ........................................... G01S 5/02
[52] U.S. Cl. ..................... 342/424; 342/442; 342/156; 342/373
[58] Field of Search ..................... 342/442, 424, 342/156, 373

[56] References Cited

U.S. PATENT DOCUMENTS 5,745,078  4/1998  Baghdady ............................... 342/446
5,767,814  6/1998  Conroy et al. ........................... 343/774

Primary Examiner—Theodore M. Blum
Attorney, Agent, or Firm—Hoffmann & Baron, LLP

[57] ABSTRACT

An antenna and system for determining two-dimensional angle-of-arrival includes circular array interferometers for azimuth, linear interferometers for elevation, and a mast for positioning the interferometers in a vertically stacked orientation. The circular array interferometers exhibit azimuth constant-phase-difference contours orthogonal to elevation constant-phase-difference contours exhibited by the linear interferometers. An antenna and system for determining azimuth of input signals includes ambiguous and non-ambiguous circular array interferometers. The non-ambiguous circular array interferometer resolves ambiguities introduced by the ambiguous circular array interferometer, the at least one ambiguous circular array interferometer operatively coupled to a low-order Butler matrix and power divider/combiner such that a high order Butler matrix is not required to generate omnidirectional phase modes from the ambiguous circular array interferometer. A method for determining phase differences indicative of two-dimensional angle-of-arrival includes determining a first phase difference indicating azimuth using circular array interferometers, determining a second phase difference indicating elevation using linear interferometers, and orienting the interferometers in a vertically stacked orientation such that the azimuth constant-phase-difference contours are orthogonal to the elevation constant-phase-difference contours. A method for determining phase difference representative of azimuth includes determining a phase difference indicative of azimuth using ambiguous circular array interferometer and non-ambiguous circular array interferometers, and resolving ambiguities in azimuth introduced by the ambiguous circular array interferometer using the non-ambiguous circular array interferometer, the at least one ambiguous circular array interferometer operatively coupled to a low-order Butler matrix and power divider/combiner such that a high order Butler matrix is not required to generate omnidirectional phase modes from the ambiguous circular array interferometer. A method for determination of polarization of input signals with only one added element.

51 Claims, 22 Drawing Sheets

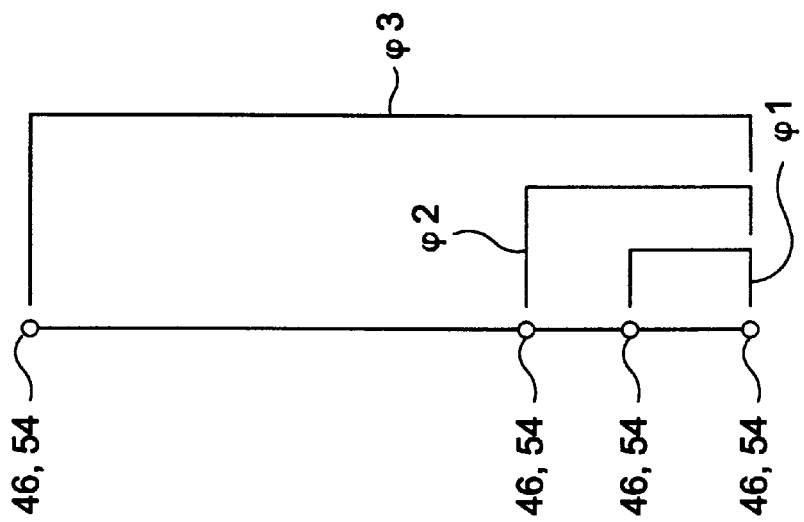
FIG-11C DOUBLE-DUAL — THREE PHASE COMPARISONS
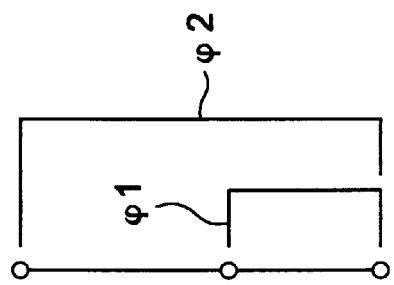
FIG-11B DUAL — TWO PHASE COMPARISONS
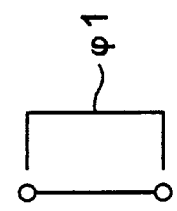
FIG-11A SINGLE — ONE PHASE COMPARISON

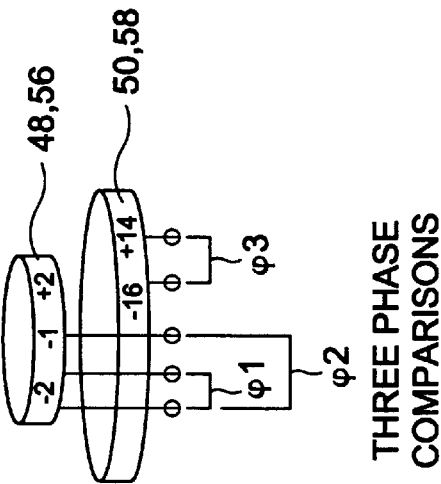
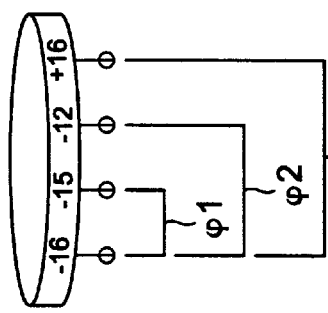
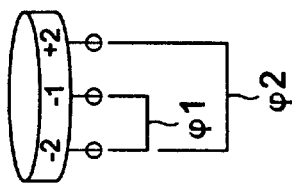
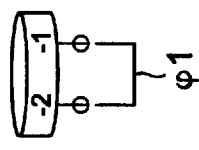

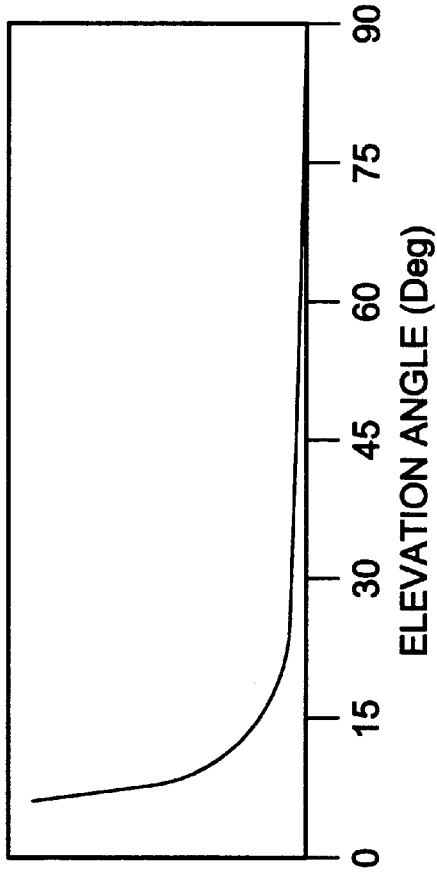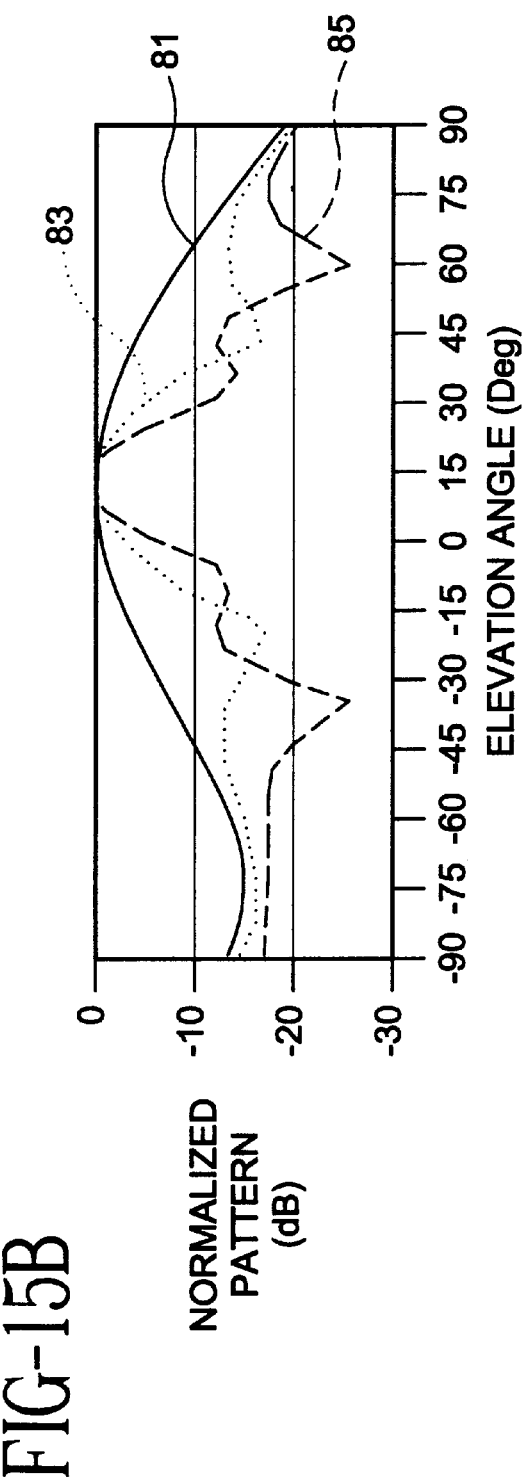
FIG-15A
FIG-15B

ANTENNA AND METHOD FOR TWO-DIMENSIONAL ANGLE-OF-ARRIVAL DETERMINATION

CROSS-REFERENCE TO RELATED APPLICATIONS

This application claims the benefit and priority of U.S. Provisional Application Serial No. 60/107,476, entitled Antenna and Method for Three-Dimensional Angle-of-Arrival Determination, filed on Nov. 6, 1998, the disclosure of which is incorporated herein by reference.

BACKGROUND OF THE INVENTION

1. Field of the Invention

This invention relates generally to antennas, and more specifically relates to antennas and antenna systems that determine azimuth and elevation.

2. Description of the Prior Art

The determination of azimuth and elevation or two-dimensional angle-of-arrival (AOA) is widely used in Electronic Warfare Support Measures (ESM) and ELectronic INTelligence (ELINT) radar systems. Interferometry typically provides the basis for making these determinations, and can be performed with linear arrays or circular arrays of antenna elements. Wide-band, high-accuracy, AOA measurement over a full 360-degree instantaneous field-of-view (IFOV) has been identified by the Department of Defense as a required ESM/ELINT capability for battlefield surveillance and targeting systems.

A conventional linear array of antenna elements or linear interferometer 10 is illustrated in FIG. 1. The linear interferometer 10 includes antenna elements 12, and a phase receiver 14. The antenna elements 12 are offset by a predetermined distance d. The linear interferometer 10 uses the difference in phase φ between the input signals 16 received by the offset antenna elements 12 to determine the AOA in a planar coordinate system. The sine of the AOA θ of the input signals 16 is proportional to the phase difference φ between the input signals received by the offset antenna elements 12 in accordance with equation (1) as follows:

$$\text{Phase difference} = 2\pi d/\lambda \sin\theta \quad (1)$$

In practice, linear interferometers typically utilize three or four antenna elements and provide instantaneous coverage over a 90–120-degree angular sector. Utilizing time-division multiplexers (not shown) to share receiver channels, three or four linear interferometers, each oriented to cover a different 120 degree sector, can provide a 360-degree field-of-view with a three or four-channel phase receiver (not shown). However, since only one linear interferometer is connected to the phase receiver at a given instant in time, this configuration provides only a 90–120-degree IFOV. To obtain a 360-degree IFOV, each antenna element of the three linear interferometers must be connected directly to a channel of the phase receiver. Therefore, nine or twelve or up to sixteen receiver channels are required. Various configurations for sharing a limited number of receiver channels using a greater number of antennas have been devised. These all result in complex, fast switched, receiving systems, or sector-by-sector, time-sequential attachment of the receive system to the antenna.

A conventional circular array of antenna elements or Circular Array Interferometer (CAI) 18 is illustrated in FIG. 2. The CAI 18 includes a plurality of antenna elements 12 arranged in a substantially circular orientation. The antenna elements 12 may be dipoles, monopoles, slots, microstrip patches or alternative types of radiating or receiving antenna elements.

The CAI 18 inherently provides instantaneous coverage over a full 360-degree IFOV. The number of antenna elements is chosen based on AOA accuracy requirements and physical size constraints, but is usually a power of two. Typical CAI's utilize 4, 8, 16 or more antenna elements 12. Each antenna element 12 in the circular array 18 is connected to a Butler matrix input port 20 as shown in the block diagram of FIG. 2. Outputs 22 of the Butler matrix provide omnidirectional phase modes. These are reception responses which are equal magnitude for all AOA, but with phase which is proportional to the value of the AOA. The proportionality constant is an integer equal to the order of the mode. The number of omnidirectional phase modes required for AOA determination in a planar coordinate system is approximately equal to the base 2 logarithm of the number of antenna elements, e.g., 3 modes for 8 elements. Therefore, an eight element CAI needs only three receiver channels. This can be compared to the nine or twelve channels required for the 360-degree IFOV linear interferometer system described above, which requires receiver channels equal to the number of antenna elements. This translates into a smaller, less complex, lower cost, 360-degree IFOV ESM/ELINT system.

The antenna elements 12 of the CAI 18 are located at equiangular distances around the circumference of a circle. While each antenna element 12 typically has only a 90- to 120-degree IFOV, the circular geometry of the CAI 18 inherently provides a full 360-degree IFOV.

A block diagram of an eight-input/eight-output or 8×8 Butler matrix 24, utilizing 3-dB quadrature couplers, is given in FIG. 3. The Butler matrix 24 is a network which performs a discrete Fourier transform on a set of the antenna element signals at its inputs using analog signal processing in real-time. The results are the modal outputs of the CAI. The Butler matrix 24 is implemented as a set of 3-dB directional couplers 26 (either quadrature or 0/180 hybrids) and phase shift networks 28 that are interconnected by a labyrinth of transmission lines. While in this example the total number of modal outputs 22 is equal to the number of antenna element inputs 20, only three of the modal outputs 22 are required to accurately determine the AOA of incoming signals. Therefore, only three channels of the phase receiver are required for 360-degree IFOV AOA determination.

Butler matrices are typically passive and reciprocal microwave devices. The manner in which a Butler matrix connected to a circular array establishes phase modes is most easily seen by invoking reciprocity and considering the CAI 18 and Butler matrix 20 as a transmitting configuration. A signal into any mode port 22 of the Butler matrix 24 generally results in signals of equal amplitude and a linear phase gradient at the antenna element ports 20. The phase gradient is determined by which mode port 22 is excited. Exciting a single mode port 22 results in a specific far field radiation or mode pattern. The antenna pattern will have an omnidirectional amplitude and a phase gradient with azimuth angle which matches the phase gradient along the antenna elements of the circular array. A description of the typical Butler matrix, beam forming network and steering circuit (including phase shifters) is provided in U.S. Pat. No. 4,414,550, which is hereby incorporated by reference in its entirety.

Electronically steerable circular radar and communication system arrays are well known in the art and are described in numerous patents, such as, for example, U.S. Pat. No. 4,414,550 to Carl P. Tresselt and U.S. Pat. No. 4,316,192 to Joseph H. Acoraci, which are hereby incorporated by reference in their entirety. Such circular arrays have N number of antenna elements, and are usually coupled to an N×N Butler matrix, N or N-1 phase shifters and a signal combining network. As is well known, the transformed signals from the Butler matrix include amplitudes, which are substantially independent of the direction of wavefront incidence, and phase values, which are approximately linearly dependent on direction of wavefront incidence. In these respects, the transformed signals resemble those produced by a linear array. Thus, it is said in the art that the Butler matrix "linearizes" the circular array. Indeed, the plurality of phase shifters, which are used to steer the antenna beam pattern, and the signal combining network, which is used to form the beam patterns of the circular array, are interconnected and controlled in a manner similar to that of the linear array.

For applications where high gain, sensitivity, and selectivity are required, an enhanced CAI system with a unique high gain, narrow beamwidth operating mode is required. Such a system can operate in both a wide open full 360-degree IFOV omnidirectional mode and a narrower IFOV high-gain directional-beam mode capable of full 360-degree coverage via electronic scanning in a planar coordinate system. The block diagram of a 16-element implementation of this system is given in FIG. 4. Low noise preamplifiers 30 are located at the output of each antenna element 12 to mask the losses of the Butler matrix 24 and to maximize sensitivity. The modal outputs of the Butler matrix 24 are connected to phase compensation networks 31 and digital phase shifters 32. The phase shifter outputs are combined to form high gain mode monopulse (sum and difference) directional beams 34. Beam steering is accomplished by appropriate control of the phase shifter 32 settings. The omnidirectional mode is obtained using directional couplers 36 to couple off selected modal outputs 22 of the Butler matrix 24. Therefore, both operating modes are available simultaneously and can be independently controlled.

The conventional approach to obtain highly accurate two dimensional (azimuth and elevation) instantaneous direction finding (DF) over a full hemisphere and the 2–18 GHz frequency band, involves the use of dual, orthogonal linear interferometers in each quadrant, forming the linear interferometer set 38 illustrated in FIG. 5. The antenna elements 12 of the quadrant linear interferometer set 38 are also shown in FIG. 5. Full frequency band coverage is obtained by using two nested sets of antenna elements, one set of antenna elements for 2–6 GHz (the outer, larger set), and another set of antenna elements for 6–18 GHz (the inner, smaller set). A long baseline (separation between the outer elements in each linear array) is required for high accuracy, but this results in AOA ambiguities. Intermediate elements in each array are used to resolve the ambiguities. In the example shown, five elements are used to form one linear interferometer. The orthogonal interferometer also uses five elements but shares one common element, so that the dual pair requires 9 elements per band, per quadrant. Unfortunately, the entire quadrant linear interferometer set requires 72 antenna elements and a like number of receiver channels, while occupying a relatively large volume of approximately 216 cubic feet. In addition, the quadrant linear interferometer 38 is subject to coning errors and its output must be corrected accordingly.

Coning relates to the locus of points on a direction sphere corresponding to constant phase difference between a pair of signals received by a pair of linear array elements. For example, consider the locus for a pair of elements in the horizontally oriented array portion of the quadrant linear interferometer 38. This locus defines a circle or the base of a cone having an axis which is coincident with an axis of the horizontally-oriented array portion. So long as elevation is approximately zero (i.e., at the horizon), the phase difference provides an accurate representation of the azimuth. However, as is well known in the art, for a horizontally-oriented linear interferometer to give an accurate AOA reading off-horizon (non-zero elevation), the elevation measurement must be used to correct the phase difference. This correction is referred to as the coning correction. Phase difference measurements determined by CAI's do not exhibit coning errors and, therefore, do not require coning correction.

FIG. 6 illustrates a stereographic projection of a direction hemisphere. The projection also contains azimuth constant-phase-difference contours 40 and elevation constant-phase-difference contours 42 for the quadrant linear interferometer. An additional disadvantage of using linear interferometers for both azimuth and elevation determinations is that the azimuth constant-phase-difference contours 40 and elevation constant-phase-difference contours 42 are only orthogonal at the horizon 44 as illustrated in FIG. 6. Lack of orthogonality is detrimental because it increases the AOA measurement sensitivity to phase measurement errors. Furthermore, the azimuth constant-phase-difference contours 40 do not align with the radial contours of constant azimuth. Thus, processing (coning correction) is required to relate phase values to corresponding azimuth values.

High accuracy with a linear interferometer requires a large separation (baseline) between array elements. The azimuth angle determined by a long-baseline linear interferometer is ambiguous and needs to be resolved by a supplementary coarse AOA using a shorter baseline determination; this correction is complex. Similarly, with a CAI, high accuracy requires a large diameter circle with many elements equispaced along the circumference. With the prior art, such a CAI has required a high order Butler matrix (such as a 64×64 Butler matrix). Such a Butler matrix is both complex and costly.

OBJECTS AND SUMMARY OF INVENTION

It is an object of the present invention to provide an omnidirectional antenna and antenna system for two-dimensional angle-of-arrival determination.

It is another object of the present invention to provide an antenna and antenna system exhibiting an antenna pattern including azimuth constant-phase-difference contours that are orthogonal to elevation constant-phase-difference contours.

It is a further object of the present invention to provide an antenna and antenna system that determines azimuth using circular array interferometers without requiring a high order Butler matrix.

It is a further object of the present invention to provide a polarimeter that requires only one additional omnidirectional antenna.

It is a further object of the present invention to provide an antenna and antenna system in which azimuth and elevation determination is substantially decoupled.

It is a further object of the present invention to provide an antenna and antenna system which includes a central cable conduit so that antenna aperture blockage by cables can be avoided.

It is a further object of the present invention to provide an antenna and antenna system including a high level of accuracy, a relatively small volume, and requiring a reduced number of phase receiver channels.

In accordance with the present invention, an antenna for determining two-dimensional angle-of-arrival of input (e.g., received) signals is provided, which includes a plurality of horizontally-oriented circular array interferometers for determining the azimuth of the input signals and a plurality of vertically-oriented linear array interferometers for determining elevation of the input signals. The plurality of circular array interferometers and the plurality of linear interferometers can be positioned in a substantially vertically stacked orientation relative to each other. The plurality of circular array interferometers generates output signals in response to the input signals, and exhibits azimuth constant-phase-difference contours on a projection of the direction hemisphere which are free from coning errors and thus are coincident with true azimuth contours. The plurality of linear interferometers generates output signals in response to the input signals, and exhibits elevation constant-phase-difference contours on the direction sphere projection which are coincident with true elevation contours. The azimuth constant-phase-difference contours are substantially orthogonal to the elevation constant-phase-difference contours.

In further accordance with the present invention, a system for determining two-dimensional angle-of-arrival of input signals is provided, which includes an antenna as described above, at least one Butler matrix for generating omnidirectional phase modes for each of the plurality of circular array interferometers, an N-channel phase receiver for determining the phase difference between output signals from the plurality of linear interferometers and the phase difference between output signals from the plurality of Butler matrix phase modes of the circular array interferometers, a first translation circuit which converts the phase difference between output signals from the plurality of Butler matrix phase modes into azimuth information, and second translation circuit which converts the phase difference between output signals from the plurality of linear interferometers into elevation information. Each Butler matrix is responsive to the output signals from its corresponding circular array. The indicated azimuth of the input signals is a function of the phase difference between output signals from the plurality of Butler matrix phase modes. The elevation of the input signals is a function of the phase difference between output signals from the plurality of linear interferometers.

In still further accordance with the present invention, an antenna for determining azimuth of input signals is provided, which includes a plurality of circular array interferometers comprising at least one ambiguous circular array interferometer and at least one non-ambiguous circular array interferometer. The non-ambiguous circular array interferometer resolves ambiguities in azimuth as indicated by the phase difference of the input signals determined by the ambiguous circular array interferometer, the at least one ambiguous circular array interferometer operatively coupled to a low-order Butler matrix and power divider/combiner such that a high order Butler matrix is not required for generating high-order omnidirectional phase modes from the ambiguous circular array interferometer.

In accordance with the present invention, a system for determining azimuth of input signals is provided, which includes an antenna as described immediately above, wherein the plurality of circular array interferometers are optionally positioned in a substantially vertically stacked orientation, at least one Butler matrix for generating omnidirectional phase modes from each of the plurality of circular array interferometers, an N-channel phase receiver for determining phase differences between phases modes of the at least one Butler matrix, a translation circuit that converts the phase difference between output signals from the at least one Butler matrix into azimuth information. The at least one Butler matrix is responsive to the output signals from the plurality of circular array interferometers. The azimuth of the input signals is a function of the phase difference between output signals of the at least one Butler matrix.

In accordance with the present invention, a method for determining phase differences indicative of two-dimensional angle-of-arrival of input signals is provided, which includes the steps of determining a first phase difference indicative of azimuth of the input signals using a plurality of circular array interferometers, generating output signals representative of the first phase difference, determining a second phase difference indicative of elevation of the input signals using a plurality of linear interferometers, and generating output signals representative of the second phase difference. The plurality of circular array interferometers exhibits azimuth constant-phase-difference contours on a projection of the direction sphere. The plurality of linear interferometers exhibits elevation constant-phase-difference contours on the projection of the direction sphere. The method further includes the step of orienting the plurality of circular array interferometers and the plurality of linear interferometers such that the azimuth constant-phase-difference contours are substantially orthogonal to the elevation constant-phase-difference contours. The method may further include the steps of translating the output signals representative of the first phase difference into azimuth information and translating the output signals representative of the second phase difference into elevation information.

In further accordance with another embodiment of the present invention, a method for determining phase difference representative of azimuth of input signals is provided, which includes the steps of determining a phase difference indicative of azimuth of the input signals using a plurality of circular array interferometers comprising at least one ambiguous circular array interferometer and at least one non-ambiguous circular array interferometer, and resolving ambiguities in azimuth as indicated by the phase difference of the input signals determined by the ambiguous circular array interferometer using the non-ambiguous circular array interferometer, the at least one ambiguous circular array interferometer operatively coupled to a low-order Butler matrix and power divider/combiner such that a high order Butler matrix is not required to generate high order omnidirectional phase modes from the ambiguous circular array interferometer. The ambiguous circular array interferometer includes a first plurality of antenna elements, The non-ambiguous circular array interferometer includes a second plurality of antenna elements.

In still further accordance with another embodiment of the present invention, a method for determining azimuth of input signals is provided, which includes the steps of determining a phase difference indicative of azimuth of the input signals using a plurality of circular array interferometers comprising at least one ambiguous circular array interferometer and at least one non-ambiguous circular array interferometer, resolving ambiguities in azimuth as indicated by the phase difference of the input signals determined by the ambiguous circular array interferometer using the non-ambiguous circular array interferometer, the at least one ambiguous circular array interferometer operatively coupled to a low-order Butler matrix and power-divider/combiner such that a high order Butler matrix is not required to generate high order omnidirectional phase modes from the ambiguous circular array interferometer, generating output signals representative of phase difference indicative of azimuth of the input signal, optionally positioning the plurality of circular array interferometers in a substantially vertically stacked orientation, and translating the phase difference indicative of azimuth of the input signals into azimuth information.

These and other objects, features and advantages of the present invention will be apparent from the following detailed description of illustrative embodiments thereof, which is to be read in connection with the accompanying drawings.

BRIEF DESCRIPTION OF THE DRAWINGS

FIGS. 11(a)–(c) and FIGS. 11(d)–(g) are pictorial representations illustrating phase comparisons in various configurations of linear interferometers and CAI's, respectively.

FIG. 15A is a graph of ideal power response versus elevation angle for the Az/El DF antenna of the present invention.

FIG. 15B is a graph of normalized power response versus elevation angle for the Az/El DF antenna of the present invention.

DETAILED DESCRIPTION OF THE PREFERRED EMBODIMENTS

Figure 1:
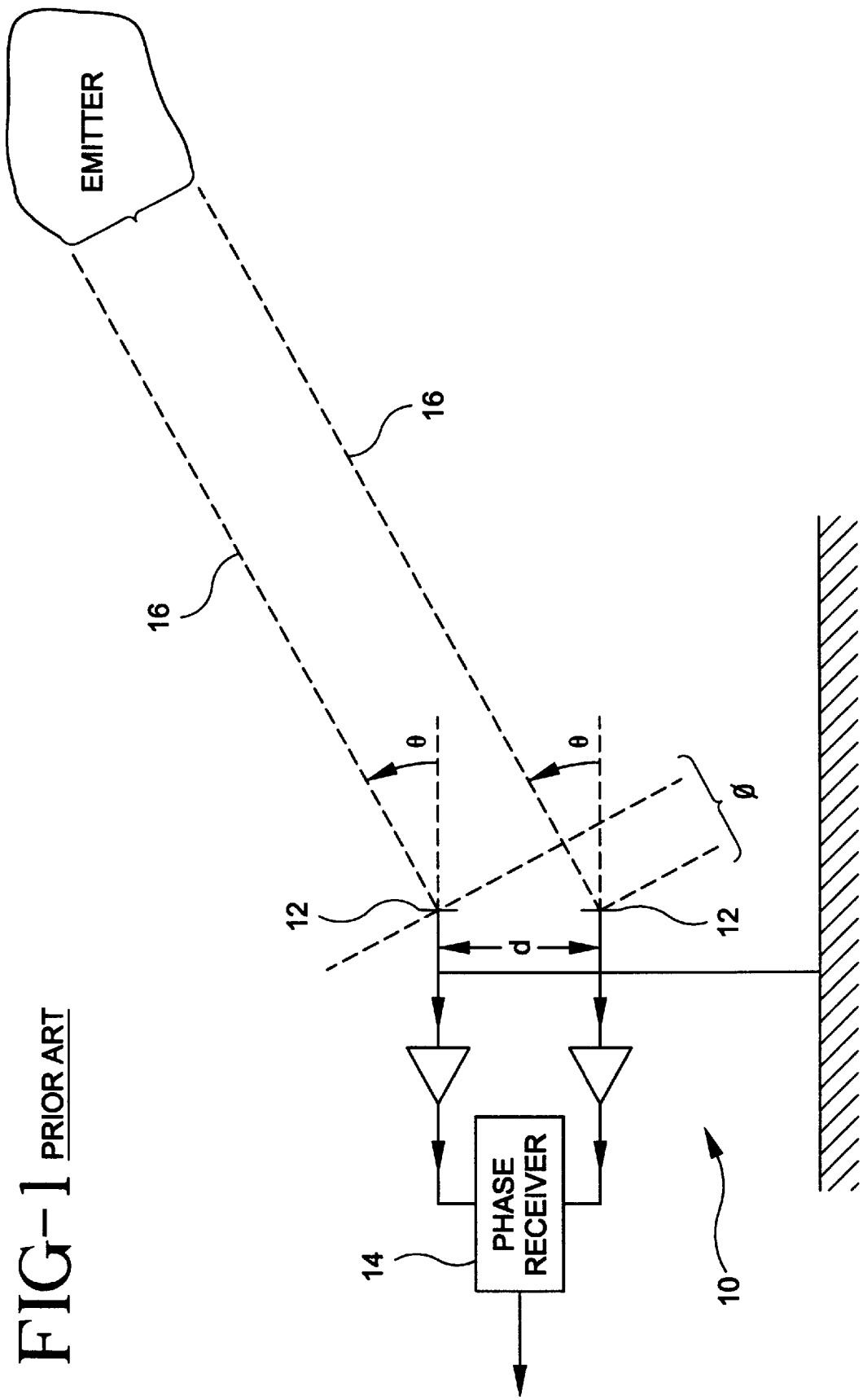
FIG. 1 is a pictorial illustration of a conventional linear interferometer.
Figure 2:
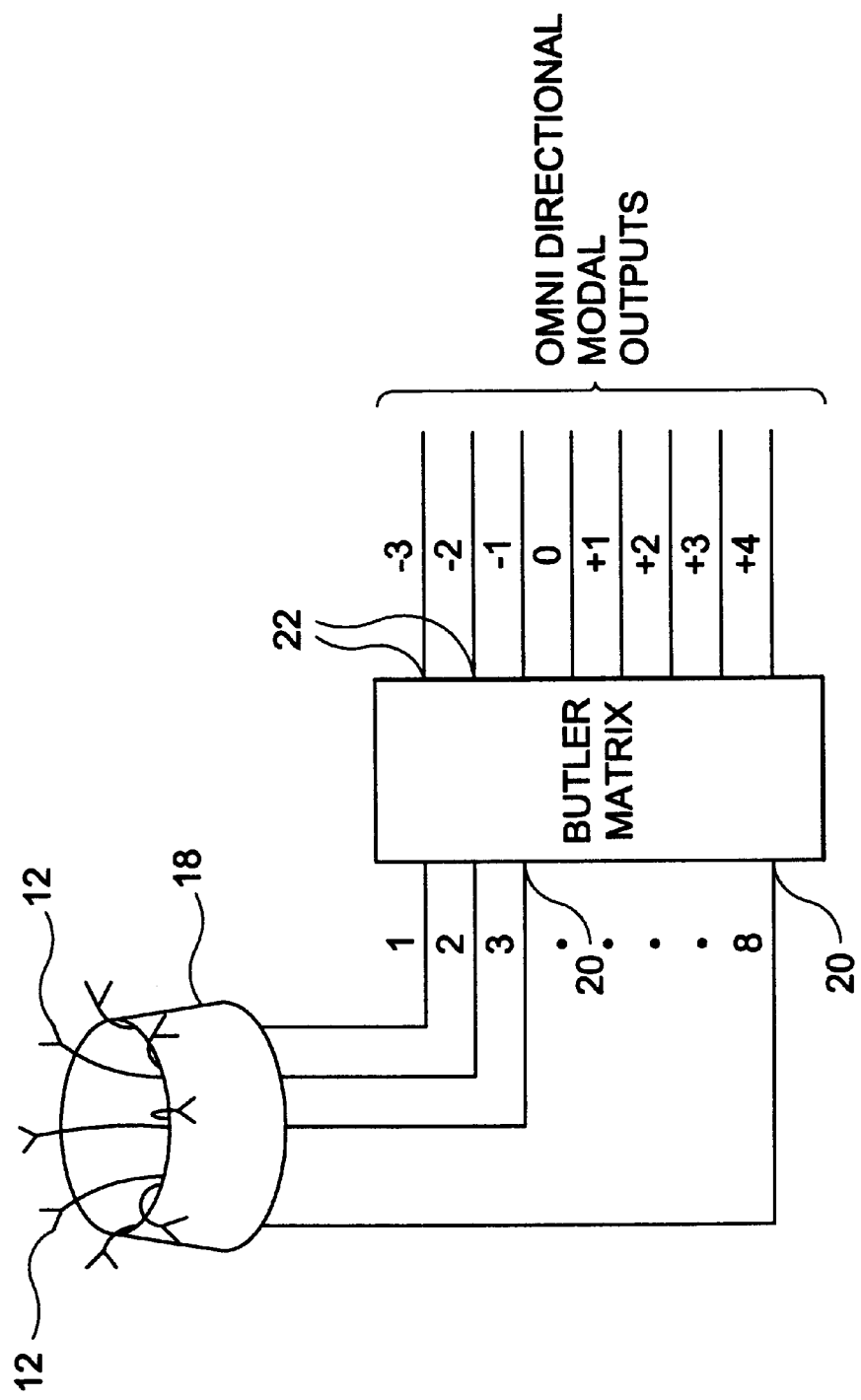
FIG. 2 is a block diagram of a conventional 8 element circular array interferometer (CAI).
Figure 3:
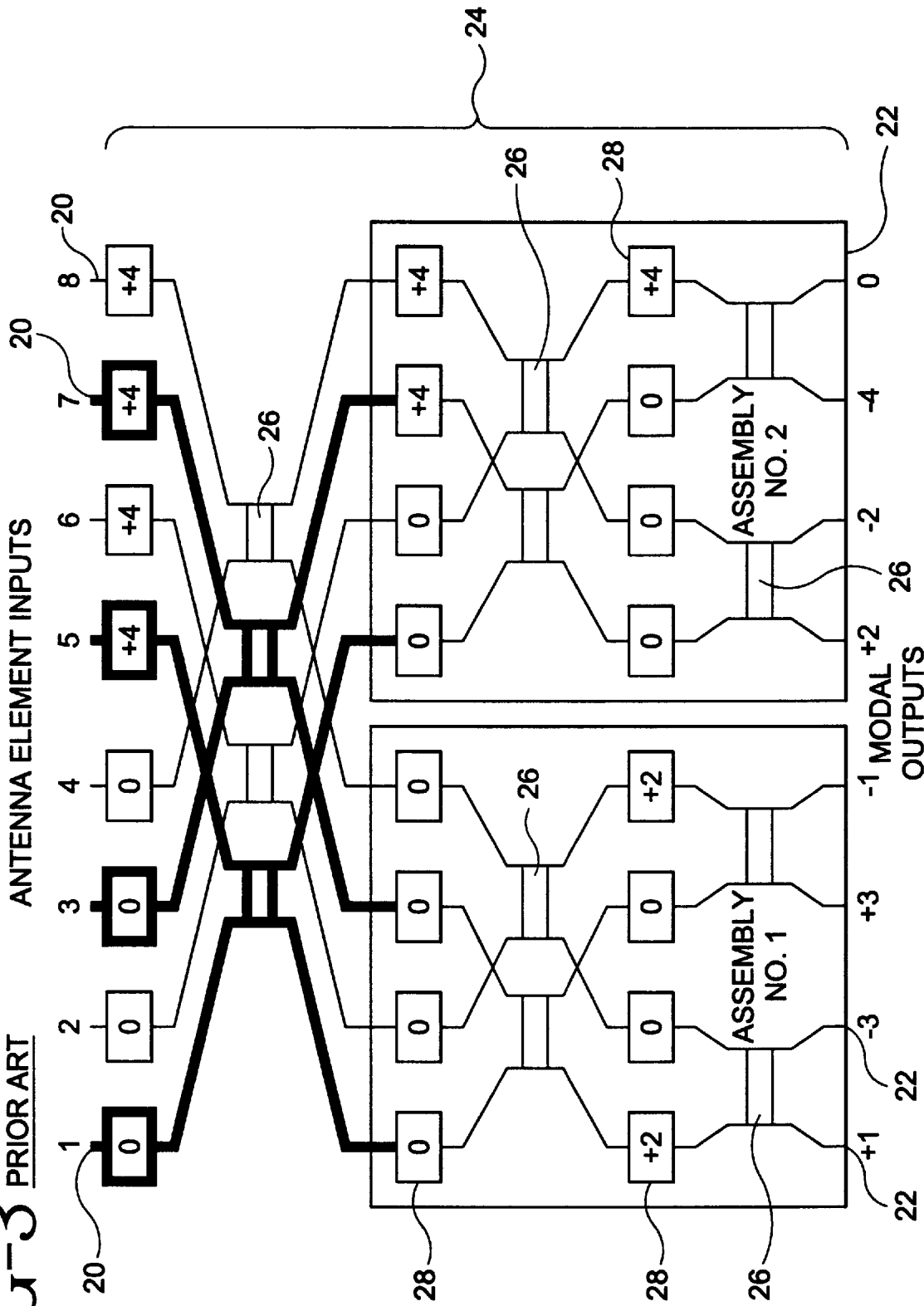
FIG. 3 is a block diagram of an 8×8 Butler matrix of the prior art.
Figure 4:
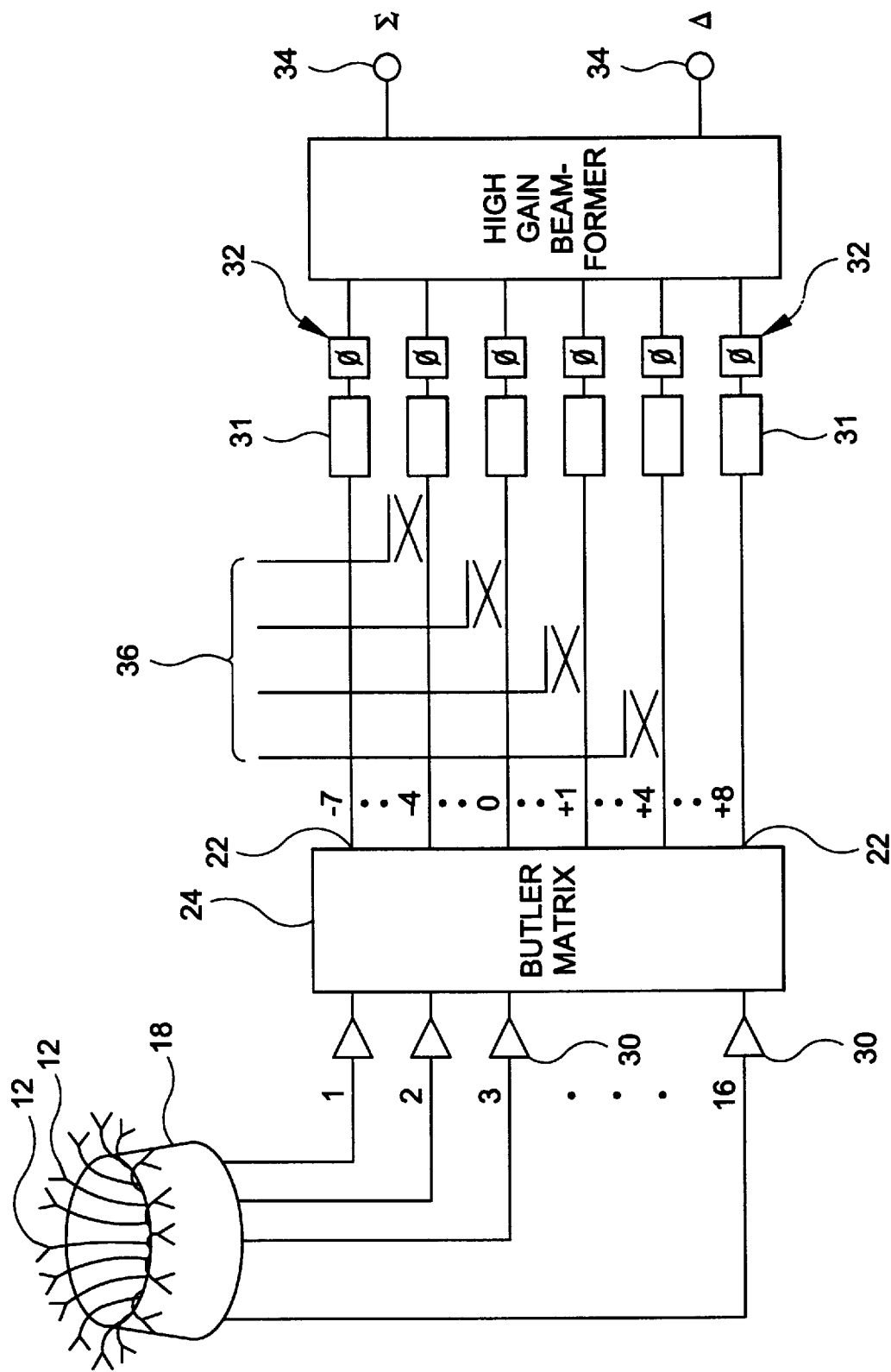
FIG. 4 is a block diagram of a 16 element CAI of the prior art
Figure 5:
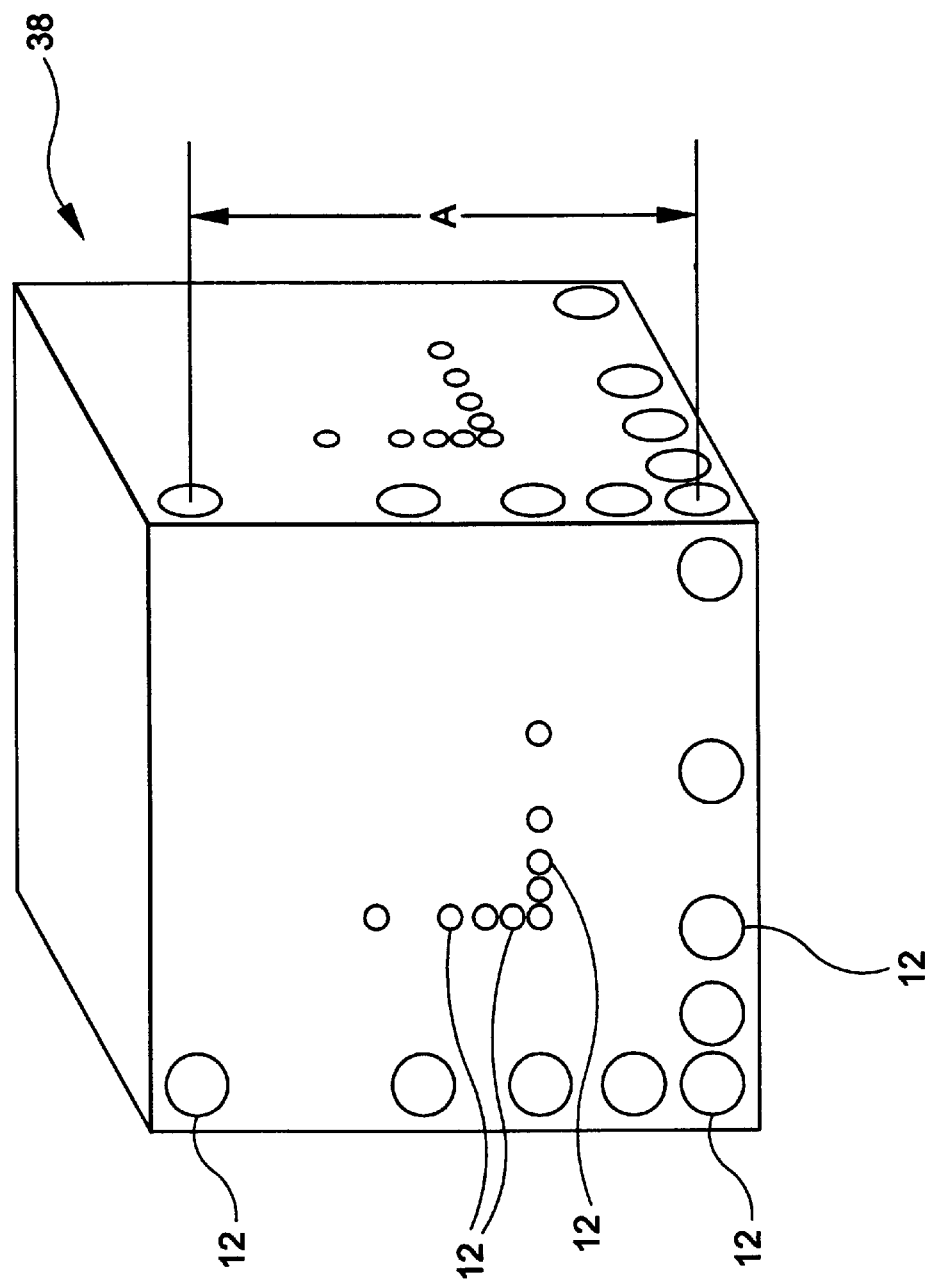
FIG. 5 is pictorial illustration of azimuth and elevation orthogonal pairs of linear interferometers which comprise quadrant linear interferometers of the prior art.
Figure 7:
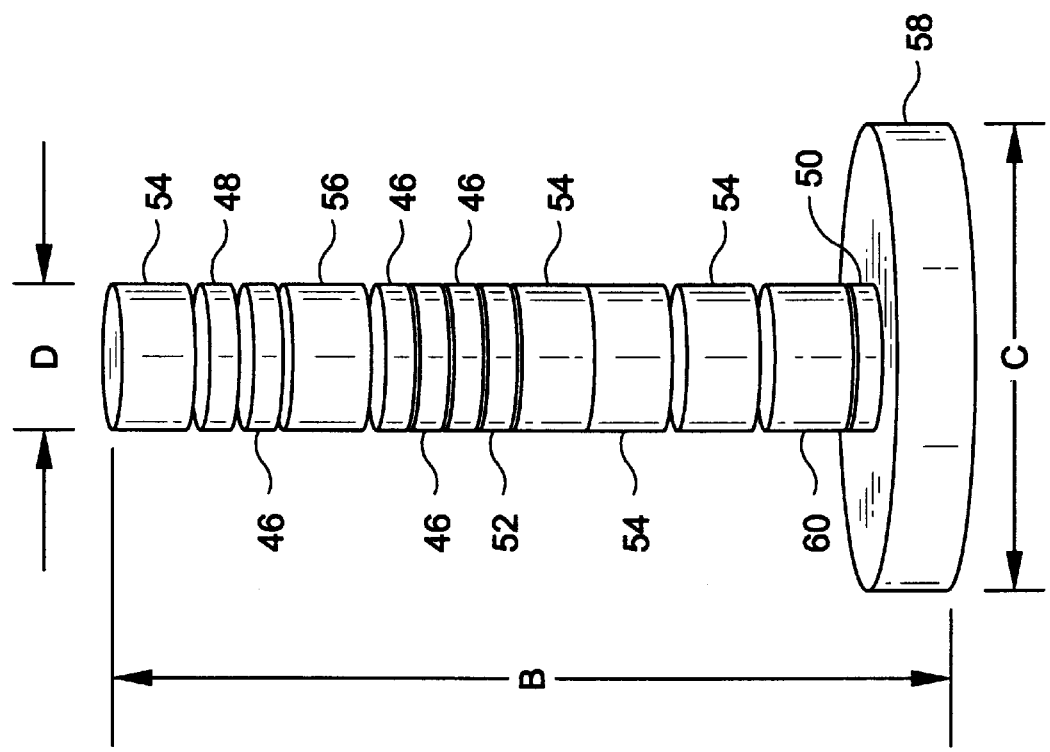
FIG. 7 is a side view of an Azimuth/Elevation Direction Finding (Az/El DF) antenna of the present invention.

FIG. 7 illustrates an external view of a wide bandwidth (2–18 GHz), Azimuth/Elevation Direction Finding (Az/El DF) antenna of the present invention. The 2–18 GHz band is efficiently handled by two independent high and low subband antennas. The low subband antenna operates over 2–6 GHz, and the high subband antenna operates over 6–18 GHz. The Az/E I DF antenna system is conceived as a vertical, base-mounted stack of circular array interferometers or CAI's 48, 50, 56 and 58 and discones 46, 52, 54 and 60 used as linear interferometers or polarimeters. The CAI's 48, 50, 56 and 58 are used to determine azimuth and the linear interferometers are used to determine elevation. The size of the stack is determined by the elevation interferometer spacings, and the total number and size of antenna elements required. The Az/El DF antenna system requires approximately 18 receiver channels for instantaneous DF as opposed to the 72 receiver channels required for a conventional "classic" quadrant linear interferometer of FIG. 5. Dimensions B, C and D are approximately 4.50 feet, 31.0 inches and 10.0 inches, respectively, for the Az/El DF antenna illustrated in FIG. 7. In contrast, dimension A for the conventional "classic" quadrant linear interferometer of FIG. 5 is typically 6.00 feet. Thus, it is clear that the Az/El DF antenna takes up less volume than an equivalent co-located linear system of the prior art.

Figure 9:
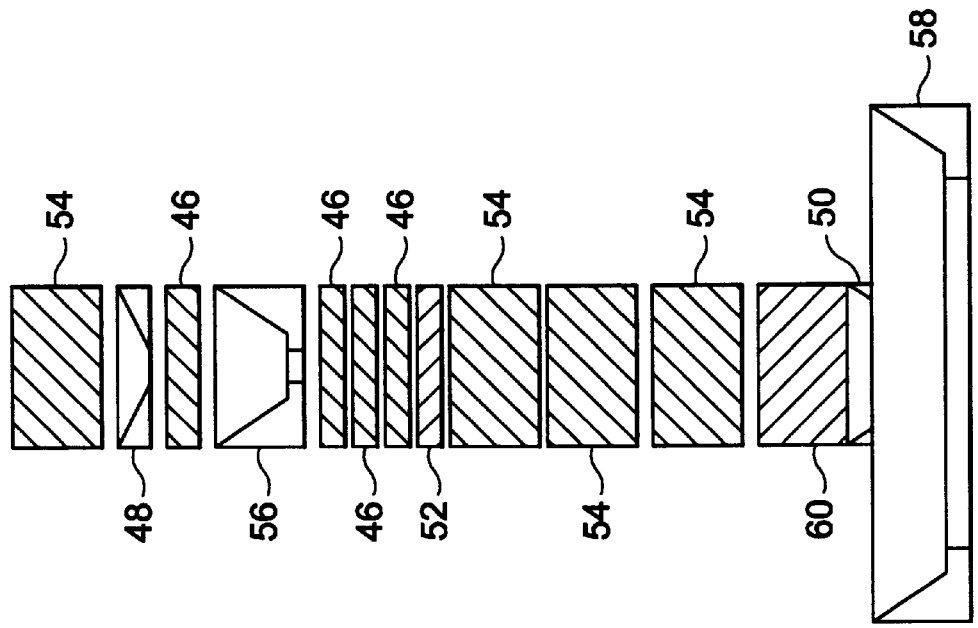
FIG. 9 is a pictorial representation of polarization for the Az/El DF antenna of the present invention.

The antennas are configured as slant 45-degree polarized in order to handle vertically-polarized, horizontally-polarized and circularly-polarized incident signals. Slant 45-degree linear polarization, as illustrated by cross-hatching on the discones 46, 52, 54 and 60 of FIG. 9, is achieved by the use of twist-grid linear polarizers (not shown) in both subbands. All antenna elements are omni-directional in azimuth, allowing 360-degree coverage. The elevation beam shape and boresight offset are determined by choosing appropriate flare angles for the discones used in the linear interferometer.

Figure 8:
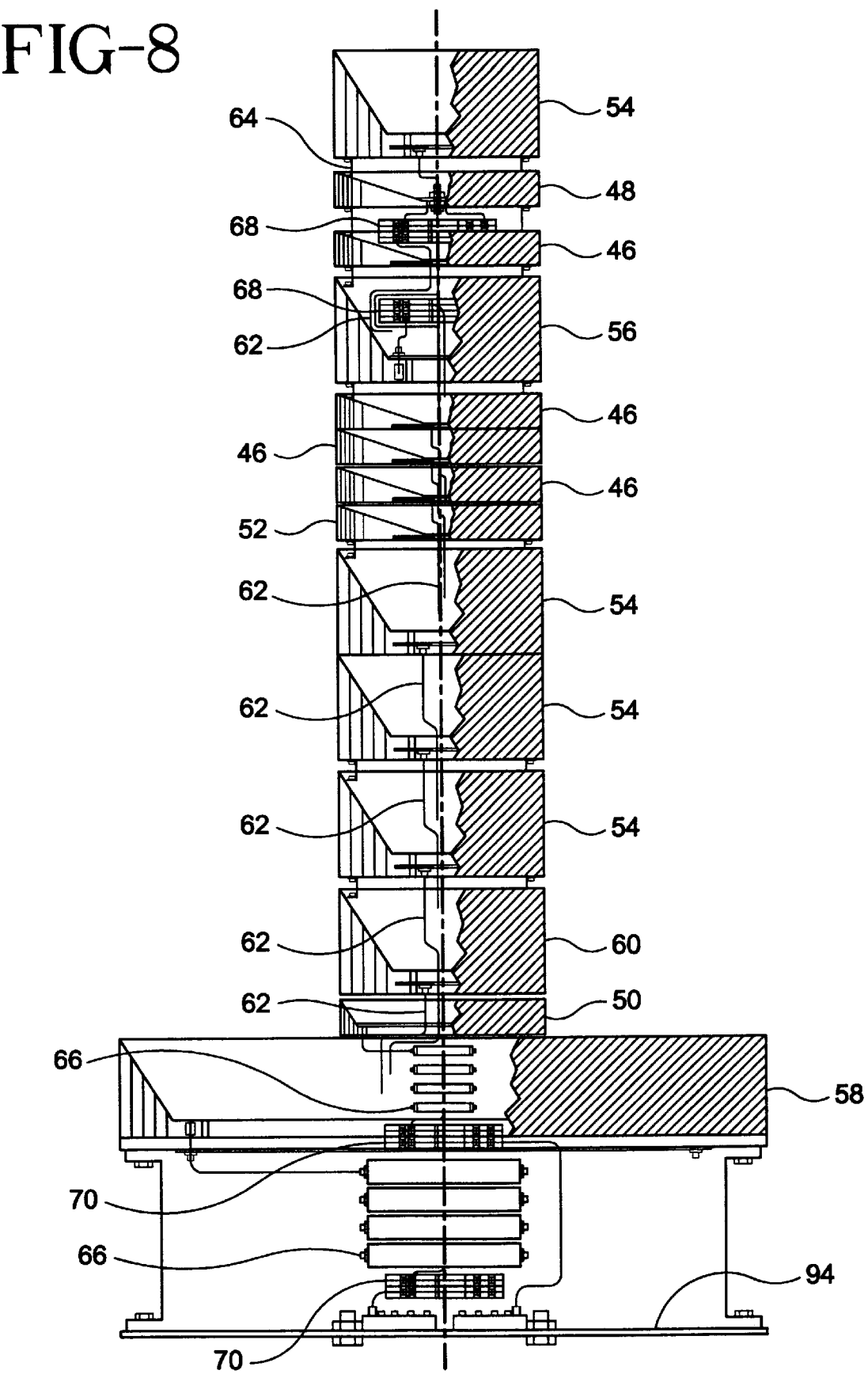
FIG. 8 is a detailed side view of the Az/El DF antenna of the present invention.

FIG. 8 is a more detailed illustration of an antenna system including the Az/El DF antenna of the present invention. The Az/El DF antenna includes high subband antenna components and low subband antenna components. The high subband antenna components include four highband elevation linear interferometers 46, a highband 8 element CAI-8 48, a highband 64 element CAI-64 50 and a highband polarimeter 52. The low subband antenna components include four lowband elevation linear interferometers 54, a lowband 8 element CAI-8 56, a lowband 64 element CAI-64 58 and a lowband polarimeter 60. Also included are radial line power combiners 66, 8×3 Butler matrices 68, 4×2 Butler matrices 70 and a base plate 94.

The preferred stacked arrangement of the Az/El DF antenna as illustrated in FIG. 8, from top to bottom, is the following: a first lowband elevation linear interferometer 54, the highband 8 element CAI-8 48, a first highband elevation linear interferometer 46, the lowband 8 element CAI-8 56, a second highband elevation linear interferometer 46, a third highband elevation linear interferometer 46, a fourth highband elevation linear interferometer 46, a highband polarimeter 52, a second lowband elevation linear interferometer 54, a third lowband elevation linear interferometer 54, a fourth lowband elevation linear interferometer 54, a lowband polarimeter 60, the highband 64 element CAI-64 50 and the lowband 64 element CAI-64 58.

Table 1 summarizes the expected performance characteristics of the Az/El DF antenna illustrated in FIG. 8.

TABLE 1

| PARAMETER | EXPECTED PERFORMANCE |
| --- | --- |
| Frequency Coverage: | 2–18 GHz |
| AOA Accuracy: | Less than 0.1 Deg rms |
| Polarization: | Right or Left Slant 45-degree Linear |
| Polarization Calibration: | Polarimetry: RHCP/LHCP or V/H |
| Gain: | −1 dBi |
| Azimuth Coverage: | 360 Degree IFOV |
| Elevation Coverages: | Horizon to 20–50 Degree (frequency dependent) |

Azimuth DF for both the high and low subbands is achieved using a double dual via dual CAI configuration as shown in FIG. 11(g). The 64-element circular array interferometers CAI-64 50, 58 provide ambiguous extra-fine-mode data eight times more precise than that of the nonambiguous eight-element CAI-8 48, 56. The CAI-8 48, 56 are used to resolve ambiguities from the CAI-64 50, 58. The CAI-64 50, 58 enable phase comparisons of mode pairs which differ in order by 32 (modes +16 and −16) for a 32-fold magnification of electrical phase angle to spatial angle. Such a configuration results in 32-way ambiguity. The eight times greater magnification directly yields eight times greater measurement precision and causes the objective angular accuracy of 0.1 degrees rms to correspond to 3.2 electrical degrees rms. Further refinement of measurement precision comes from two-dimensional calibration (azimuth and elevation), which includes polarization.

FIG. 9 illustrates how the high subband antenna 46, 48, 50, 52 and the low subband antenna 54, 56, 58 and 60 are interlaced to render the antenna system more compact. The cross-hatching of the discones 46, 52, 54 and 60 indicates the direction of their slant 45-degree linear polarization. All discones except the polarimeters 52, 60 are preferably co-polarized. The polarimeters 52, 60 are preferably cross-polarized.

Figure 10:
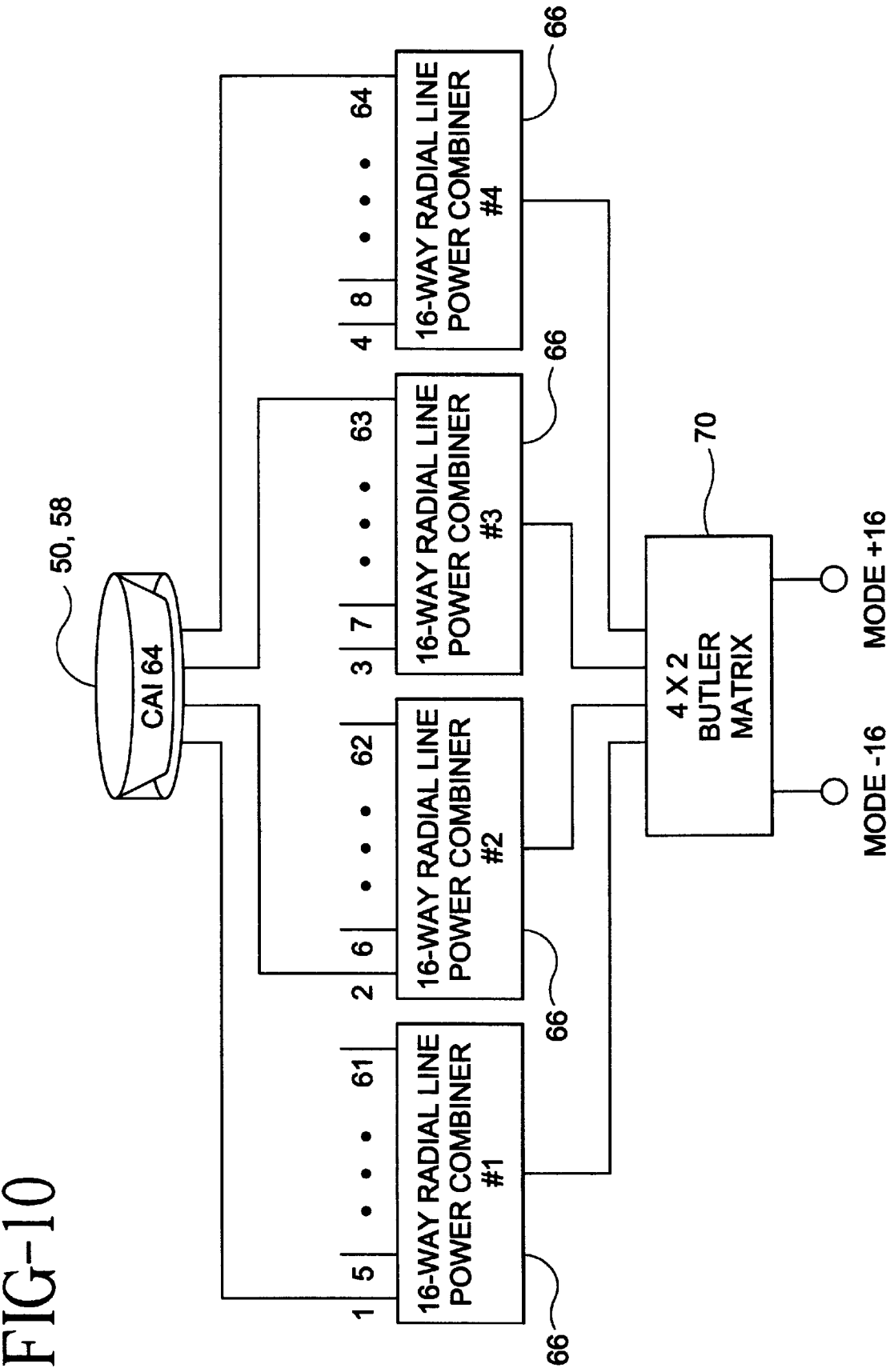
FIG. 10 is a block diagram of one configuration of a 64 element CAI with a low order Butler matrix used in the Az/El DF antenna of the present invention.

As illustrated in FIG. 10, the signals received from the elements of the CAI-64, 50, 58 are fed to four 16-way radial line power combiners 66, and the outputs from the combiners are further combined by a low order Butler matrix such as the 4×2 Butler matrix 70. Invoking reciprocity and considering the CAI-64 50, 58 as a transmitting antenna helps to illustrate the formation of its modal outputs. Feeding the −16 mode port of the Butler matrix 70 causes its four antenna ports to be excited with equal-amplitude signals, which are each separated in phase by 32. These signals are applied to the four radial line 16-way power dividers 66 so that the four-value (0, 90, 180, 270) phase distribution is repeated 16 times over 360 degrees azimuth at the 64 elements of the CAI-64 50, 58. Feeding the +16 mode produces the same result except for a reversal of phase progression direction.

The difference between modal outputs +16 and −16 is ambiguous 32 times over 360 degrees, or approximately every 11 degrees. Therefore, a supplemental antenna, in this case the eight-element CAI-8 48, 56 illustrated in FIG. 8, is used to remove the ambiguity by giving an unambiguous azimuth AOA reading, which is accurate to better than ±5.5 degrees at least 99% of the time.

FIGS. 11(a)–(c) illustrate phase comparisons between individual elements of a single, dual and double-dual configuration, respectively, of linear interferometers. FIGS. 11(d)–(g) illustrate phase comparisons between individual elements in a single, dual, double-dual and double-dual via dual CAI configuration, respectively, of CAI's. The use of the CAI-64/CAI-8 combination 50/48 and 58/56 or double-dual via dual CAI configuration (FIG. 11(g)) in the present invention is analogous to the use of the double-dual linear interferometer configuration 46, 54, also utilized in the Az/El DF antenna, in that both configurations require three phase comparisons to determine AOA and to resolve ambiguities as illustrated in FIGS. 11(c) and (g). Using the double-dual via dual CAI configuration of FIG. 11(g) avoids the need for a complex, component-intensive high order Butler matrix such as a 64×64 Butler matrix required for the double-dual configuration shown in FIG. 11(f). The accuracy achieved by any of the configurations shown in FIGS. 11(a)–(g) is determined by the largest baseline of the linear interferometer or diameter of the circular array interferometer in the case of the linear or circular arrays, respectively.

Figure 6:
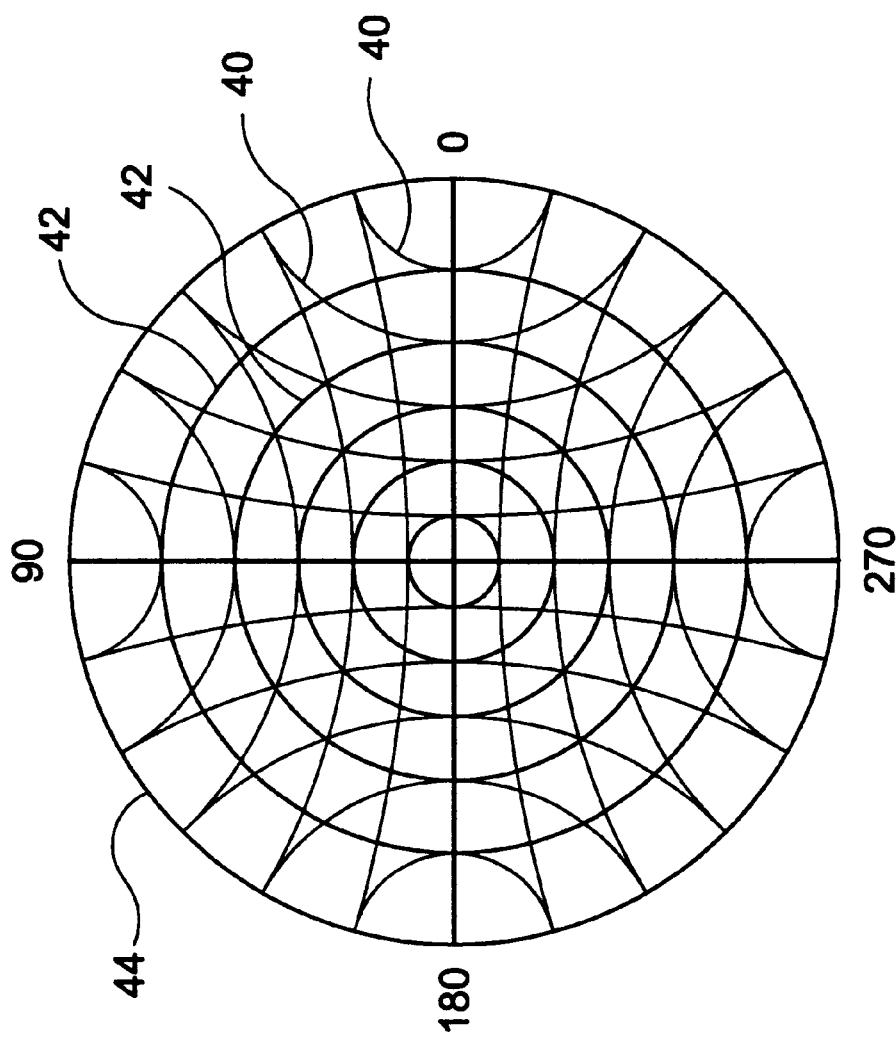
FIG. 6 is a stereographic projection of elevation and azimuth constant-phase-difference contours on a direction sphere for the quadrant linear interferometers of FIG. 5.
Figure 12:
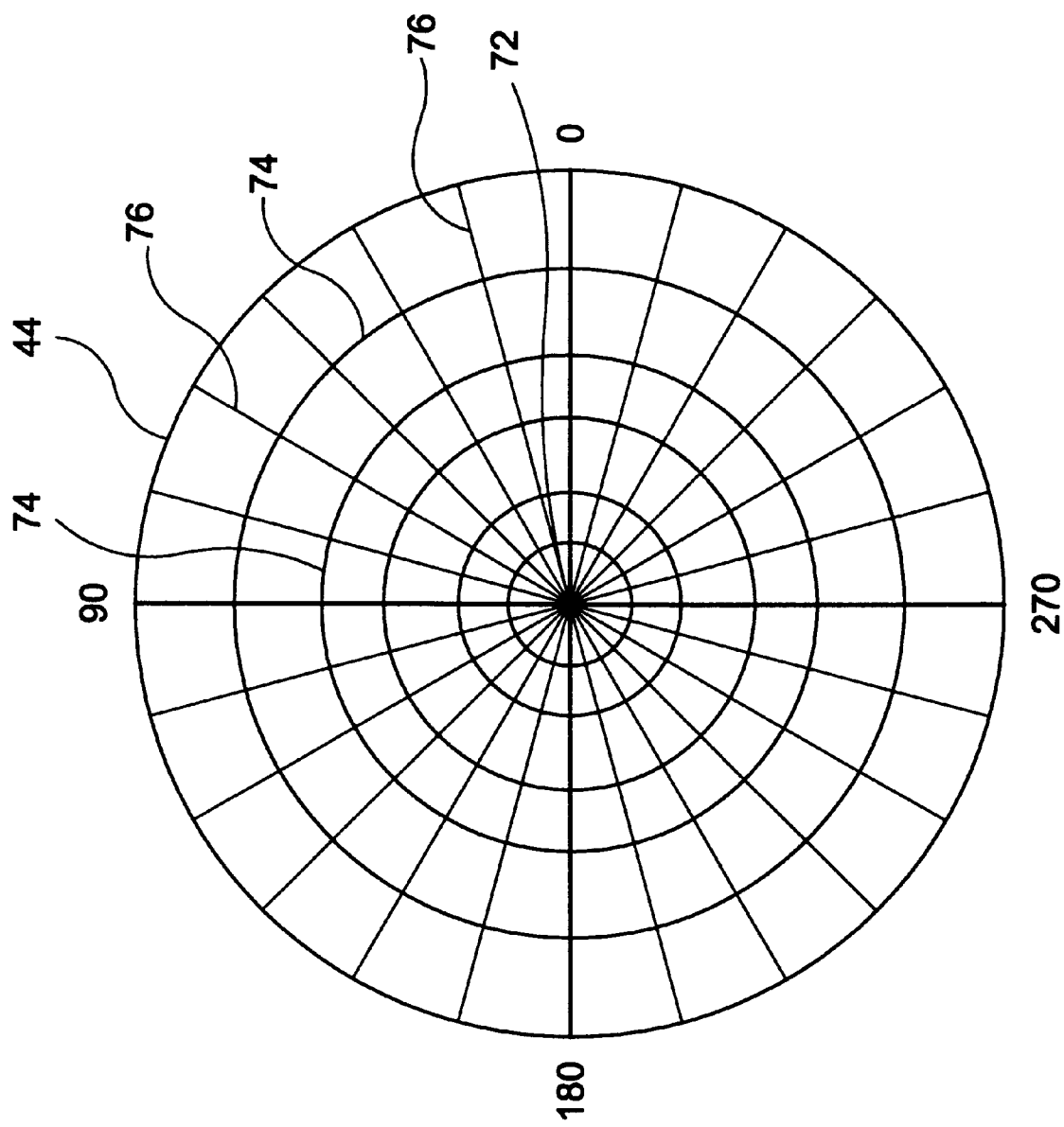
FIG. 12 is a stereographic projection of elevation and azimuth constant-phase-difference contours for the Az/El DF antenna of the present invention.

The elevation linear interferometers 46, 54 of the Az/El DF antenna system employ the double dual-level linear interferometer configuration shown in FIG. 11(c) with omnidirectional-coverage discone antenna elements 46, 54. The elevation linear interferometers 46, 54 can include biconical elements, dipoles, CAI's or alternative antennas well known in the art. Coning about the vertical axis of the linear interferometers produces constant-phase difference contours which are congruent with contours of constant elevation. These elevation constant-phase-difference contours are shown as concentric circles in FIG. 12, which displays the contours on a stereographic projection of the direction sphere. On these projections, the center is a zenith direction 72 and the outermost circle is the horizon 44. Circles of constant elevation 74 (elevation constant-phase-difference contours for the linear interferometers) are everywhere orthogonal to radial constant-azimuth 76 (constant-phase-difference between modes) contours of the CAI's. Orthogonality of the contours simplifies processing and permits more effective calibration of the elevation interferometer to better than about 0.1 degree accuracy. For this reason, the four element linear interferometers of the present invention can provide elevation DF accuracy equivalent to that of the five element linear interferometer of the prior art. Orthogonality of contours is caused by having the axis of the linear array parallel to the axis of the CAI. The axis need not be colinear or concentric for this to be true. The advantage of concentric axes is that one does not block the other. Such orthogonality is not the case when a linear elevation interferometer is coupled with four linear azimuth interferometers. As shown in FIG. 6, azimuth constant-phase-difference contours 40 and elevation constant-phase-difference contours 42 are only orthogonal for the horizon 44.

Lack of orthogonality is detrimental because it increases the AOA measurement sensitivity to phase measurement errors. Furthermore, due to coning error, the constant-phase-difference contours for the azimuth linear interferometers do not align with the radial contours of constant azimuth. As a result, processing is required to correct coning errors by relating phase values to their corresponding azimuth values. The Az/EL DF antenna system of the present invention avoids the need for such processing because the radial constant azimuth contours align with the CAI constant-phase difference contours.

Figure 13:
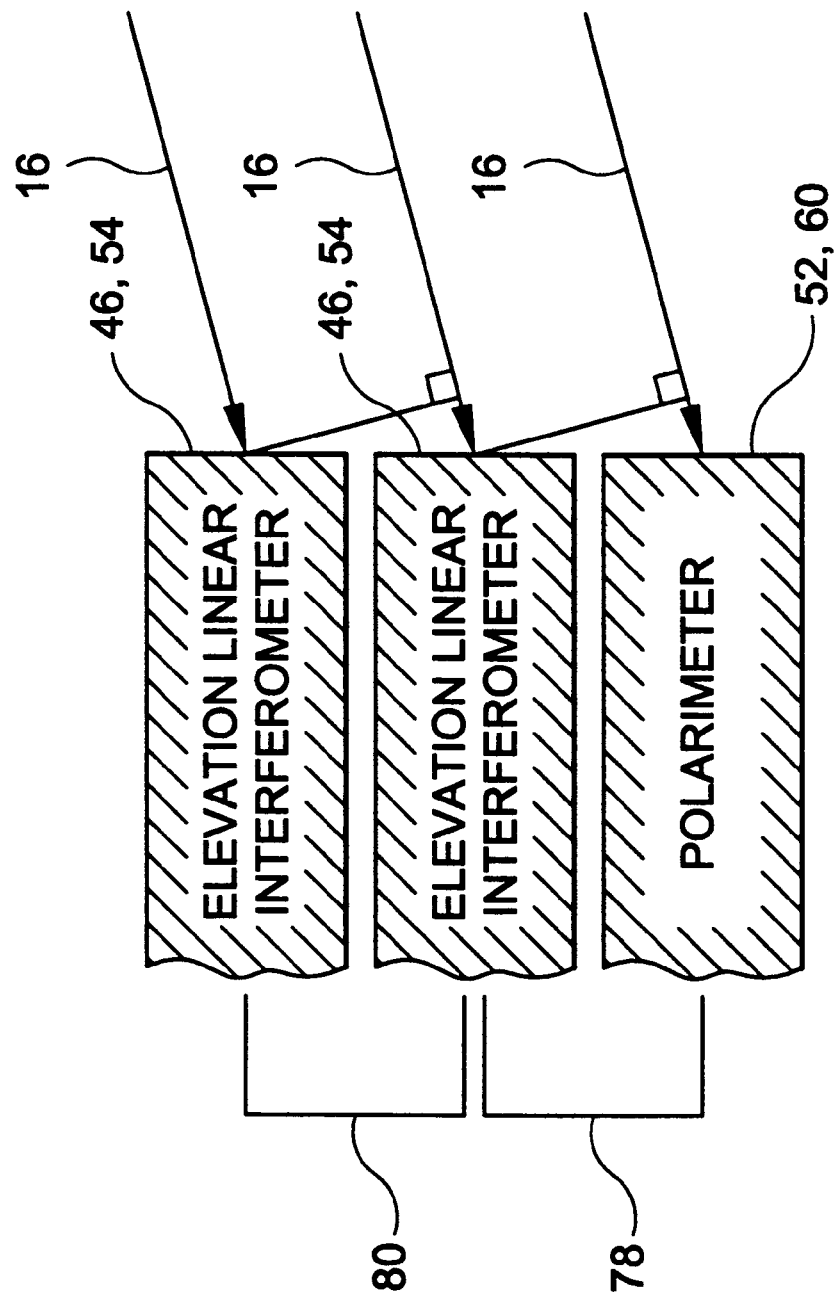
FIG. 13 is a pictorial representation illustrating operation of a polarimeter in the Az/El DF antenna of the present invention.

FIG. 13 illustrates operation of the polarimeter 52, 60. Measurement of polarization is based on the fact that the polarization of a signal can be uniquely determined if the relative amplitude and phase of any two orthogonal components of the signal are known. In each subband, one of the elevation linear interferometers 46, 54 performs an auxiliary function as a reference polarization element. The polarimeter 52, 60 includes an aperture, which is polarized orthogonally to the elevation linear interferometers 46, 54, but otherwise identical to the elevation linear interferometers. The aperture of the polarimeter 52, 60 permits amplitude and phase comparisons with the reference polarization element. The difference in phase caused by the displacement of phase centers between these two elements is eliminated using phase information from the elevation linear interferometers during processing of polarization information.

As shown in FIG. 13, the spacing 78 between the polarimeter 52, 60 and the reference interferometer element 46, 54 is equal to the spacing 80 between two of the elevation linear interferometer elements 46, 54. Phase error due to the spacing 78 is a function of signal elevation. This phase error is removed by subtracting the known phase difference between the elevation linear interferometer elements 46, 54 (the same function of elevation) from the polarization information. After subtracting the phase difference between the two elevation linear interferometers 80 from the phase difference 78 between the polarimeter 52, 60 and the elevation linear interferometers 46, 54, the residual phase of the polarimeter 52, 60 is compared to the phase of the adjacent elevation linear interferometer 46, 54. If the comparison is in-phase, then the signal is vertically polarized. If the comparison is out-of-phase, then the signal is horizontally polarized. If the comparison yields a +quadrature result or a −quadrature result, then the signal is either right circularly polarized or left circularly polarized, respectively. The amplitude of the signal is then compared to identify all polarizations.

An alternative method, which is not illustrated, to the baseline method described above provides for both measurements to be made in a single, dual-polarized aperture. The principal advantage of this method is that both polarizations share the same phase center. The dual-polarized aperture is preferably a bicone, excited vertically by monopole elements and horizontally by flared notches. While this approach is potentially feasible, the baseline method, using one of the elevation linear interferometer elements as a reference, can be implemented without requiring a new element and an additional receiver. Thus, the additional aperture needed for measurement in the baseline method can be identical to the elevation linear interferometer elements. Also, the baseline option requires half as many additional phase comparisons because the elevation linear interferometers being used as the reference in polarization measurements is already used in elevation measurements.

The height of the Az/El DF antenna is largely driven by the size of the elevation linear interferometer 46, 54 sections. However, a design tradeoff is required between size and performance, since the accuracy of a linear interferometer increases with the number of elements and the length of its base. Assuming a 0.1 degree rms elevation AOA accuracy over a horizon-to-60-degrees elevation range, and assuming a phase measurement accuracy of 2.0 degrees rms after calibration, a base length of approximately 38 half-wavelengths, at the high end of the band, is required.

The number of elements required to measure unambiguous elevation AOA is critical. The reference, Goodwin, Robert L. "Ambiguity-Resistant Three and Four-Channel Interferometers", NRL Report 8005, which is hereby incorporated by reference in its entirety, illustrates that an optimally spaced four-element interferometer will be unambiguous better than 99% of the time even with a phase measurement error of 10.0 degrees rms. By contrast, calculations indicate that the ambiguity resolution of a three-element configuration is very sensitive to phase measurement accuracy. For instance, an optimally spaced three-element interferometer with the required base length and a phase error of 2.0 degrees rms would have a probability for ambiguous readings of only 0.6%, which is acceptable, but the same interferometer will give 6.9% ambiguous readings if the phase error is increased to 3.0 degrees rms. The Az/El DF antenna of the present invention includes the four-element elevation linear interferometer 46, 54, since the improvement in statistical accuracy far outweighs the minor added cost and complexity of a fourth element for each subband.

The two subband antennas 46, 48, 50, 52 and 54, 56, 58, 60 as illustrated in FIGS. 7, 8 and 9 can be kept separate or can be interleaved in the stack. Although interleaving conserves space, positioning apertures closer together increases undesirable interaction effects. Undesirable interaction effects include signal scattering by inactive apertures and coupling from excited apertures. Interleaving was found to be the preferred approach so long as the spacing between elements due to interleaving would not be any closer than the necessary interferometer spacings within each subband. In this way any undesirable interaction would be acceptable in the interest of minimizing the overall size of the antenna. Thus, the Az/El DF antenna includes interleaved subband apertures.

FIG. 8 illustrates partial cable routing 62 for the Az/EL DF antenna. It is preferable, in a vertically stacked antenna system, to feed connector cables 62 up through the center of the stack rather than outside it, so that the cables 62 do not obstruct the apertures or interfere with antenna patterns. This requires through-holes in most of the components and careful routing of cables 62 around others. Some of the system components are not easily modified for a through-hole design. Specifically, the discones 46, 52, 54 and 60 used for elevation interferometry require significant modification to allow a central feed. Mechanical supports 64 for the discones 46, 52, 54 and 60 and CAI's 48, 50, 56 and 58 are illustrated in FIG. 8 and function to maintain the desired spacing between discones and CAI's.

A simple coaxially-fed discone might be effective for the Az/El DF antenna system if the central cable route 62 was not desired. However, a stack of discones with central conductors cannot easily be modified to allow many cables from above to be fed through the stack while preserving bandwidth and transmission mode characteristics. It is doubtful whether such a configuration could be impedance-matched over a 3:1 frequency band. Furthermore, if the center conductor diameter is large enough to allow multiple cables to be fed, it might also allow non-TEM modes (modes in which the longitudinal components of the electric and magnetic fields are not zero everywhere) to propagate. Calculations indicate that a conductor diameter smaller than approximately one tenth of an inch is required to prevent the propagation of these modes at 18 GHz.

It is preferred that the cables 62 not be located outside the antenna stack, because they may interfere with the operation of the antenna. Experimental results indicate that data is degraded when the CAI is obstructed with the cables. A ½ inch-wide vertical strip in front of the discone aperture, for example, can cause a ±16 degree ripple in the phase pattern of the aperture. For this reason, it is highly desirable to enclose all cables 62 within the antenna.

Figure 14B:
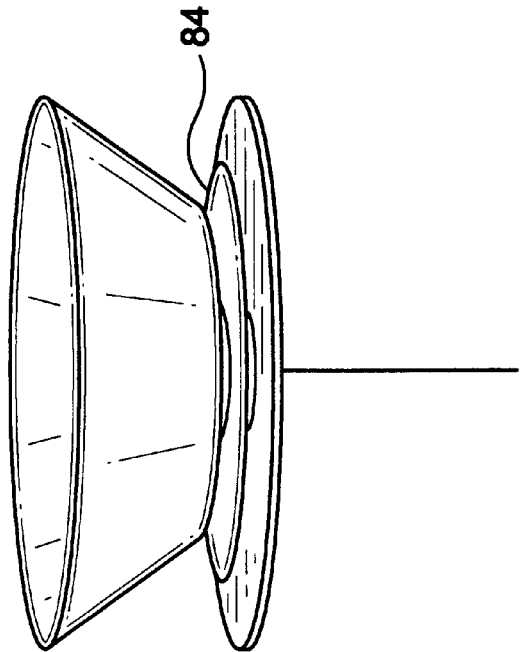
FIGS. 14A and 14B is a pictorial representation illustrating two structures for feeding an aperture in the Az/El DF antenna of the present invention.
Figure 14A:
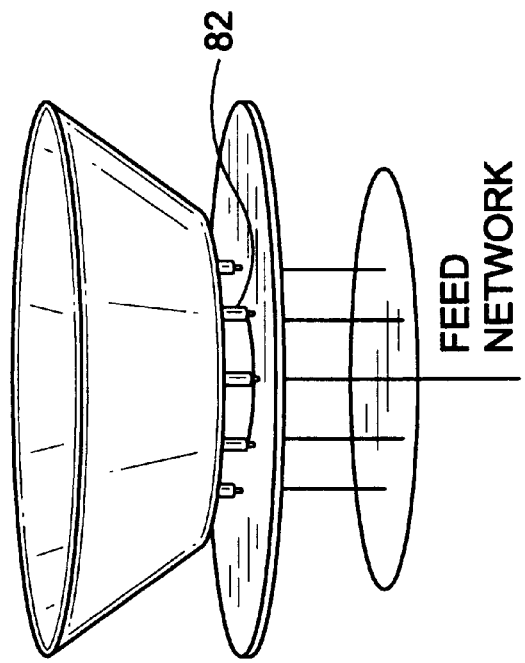

If the cables 62 are fed through the center of the stack, and a coaxially-fed aperture cannot be used, then the aperture of the discone should be fed by a ring array. Two embodiments are possible. As illustrated in FIG. 14A, the aperture may be fed with vertically polarized elements 82, using shaped monopoles. The apertures may alternatively be fed with horizontally polarized elements, using flared notches on a printed circuit board 84 as illustrated in FIG. 14B. The Az/El DF antenna system uses horizontal flared notches, coplanar with a power divider network, to feed the apertures. The main advantage of the horizontal feed is the absence of right-angle connections to the power divider network, which is unavoidable with the vertical monopole array. In addition, flared notches exhibit a larger bandwidth than shaped monopoles, although monopole elements are used successfully to achieve the 3:1 bandwidth in the CAI.

The Az/El DF antenna system is intended for multiple applications, including shipboard applications. This imposes two conflicting coverage requirements. In the absence of roll and pitch, elevation coverage below the horizon would be valueless at best and possibly detrimental to antenna performance, since reflection from the surface of the water introduces multi-path error into both azimuth and elevation measurements. Ideally, for a hypothetical stable-platform case, the elevation-plane response (radiation) pattern of the aperture is chosen to compensate for a decrease in signal intensity from sources at a distance from the antenna system. The pattern, which satisfies this condition, is proportional to the cosecant-squared of the elevation angle, as illustrated in FIG. 15A. It should be recognized, however, that a shipboard system is subject to the rolling and pitching of the ship, so that some below-horizon coverage is needed.

The ideal distribution for a stable antenna has its maximum close to the horizon, with a sharp cut-off below the horizon. However, since a distribution which is realizable from a small aperture, would be considerably more symmetrical about the maximum, an elevated boresight should be chosen to minimize surface reflections. Relatively little can be done to shape the beam because of the small size of the elevation-plane aperture and the difficulty of controlling its phase distribution. The only parameter which can be varied significantly is the boresight. FIG. 15B illustrates normalized power versus elevation angle for a low end 81, a mid band 83, and a high end 85 of the 2–18 GHz bandwidth for the Az/El DF antenna system. The boresight is located at approximately 11 degrees elevation, with a minimum 6 dB beamwidth of approximately 26 degrees at the high end of the frequency band. Approximately 85% of the total power response pattern is directed above the horizon.

Figure 16A:
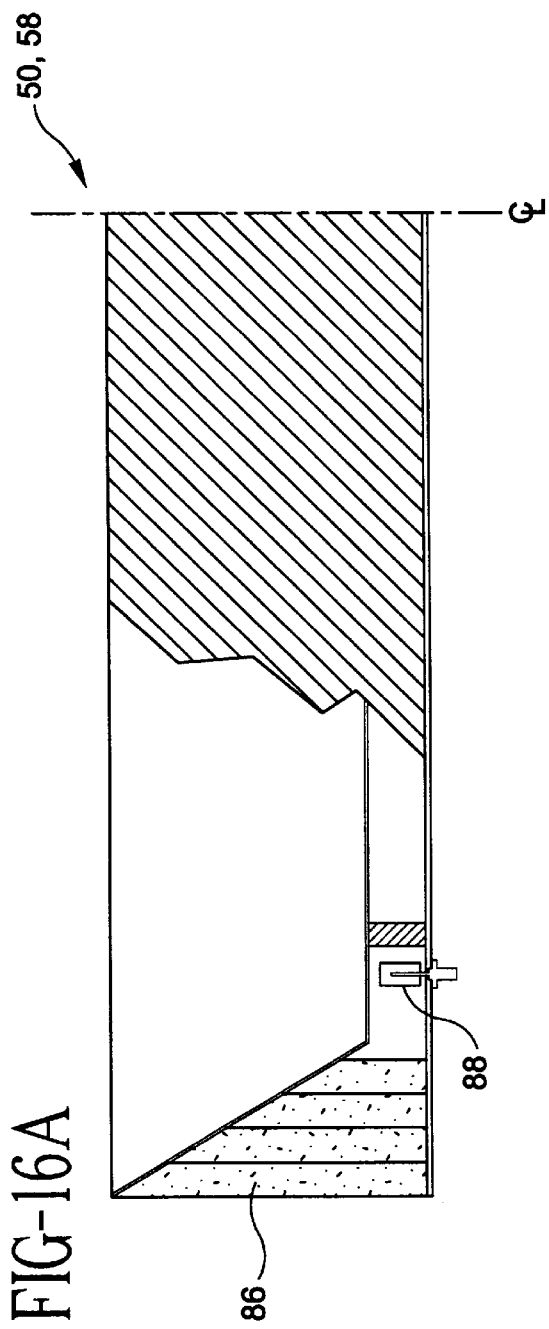
FIGS. 16A and 16B are side cross-sectional views of the CAI and linear interferometer, respectively, used on the Az/El DF antenna of the present invention.

Measurement of azimuth angle is preferably accomplished using two CAI's per subband, an eight-element CAI-8 for coarse and fine angle determination and a 64-element CAI-64 for extra-fine resolution. The CAI-8 for both subbands includes an adjusted discone flare angle to cover higher elevation. The CAI-64 design is illustrated in FIG. 16A including polarization grids on spacers 86 and a monopole element with SMA connection 88.

Figure 16B:
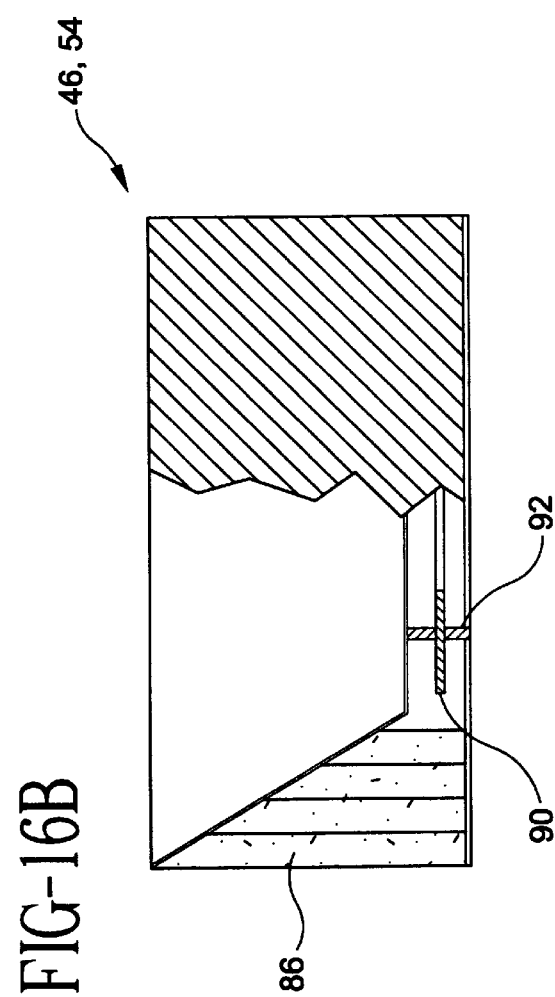

Horizontally polarized discone apertures are used in the elevation linear interferometers 46, 54. The feed network is included on a printed circuit board 90 with an array of flared notches, as illustrated in FIG. 16B, leaving room for a central cable feed 92.

The CAI-8 and CAI-64 antennas exhibit an average VSWR of 1.5:1, with only a few peaks above 2:1 across the 2–18 GHz frequency band. In general, VSWR for all system elements in the Az/El DF antenna is less than 2.5:1.

Each element of the elevation linear interferometer 46, 54 is designed with the same bicone angles and aperture sizes. Only the geometry is scaled differently for the two subbands. Assuming the boresight is at 11 degrees elevation, some of the beam is directed below the horizon, and the range of usable coverage is approximately 20 to 50 degrees wide.

Realized implementations of the CAI-8 48, 56 exhibit a nominal gain of −1 dBi. The CAI-64 50, 58 typically exhibit a gain of approximately one dB higher since its Butler matrix has less loss and its radial power combiners are very low-loss. The gain of the linear interferometer elements 46, 54 is likely to be higher than that of the CAI's 46, 50, 56, 58 since no Butler matrices are involved in the linear interferometer design.

Figure 17:
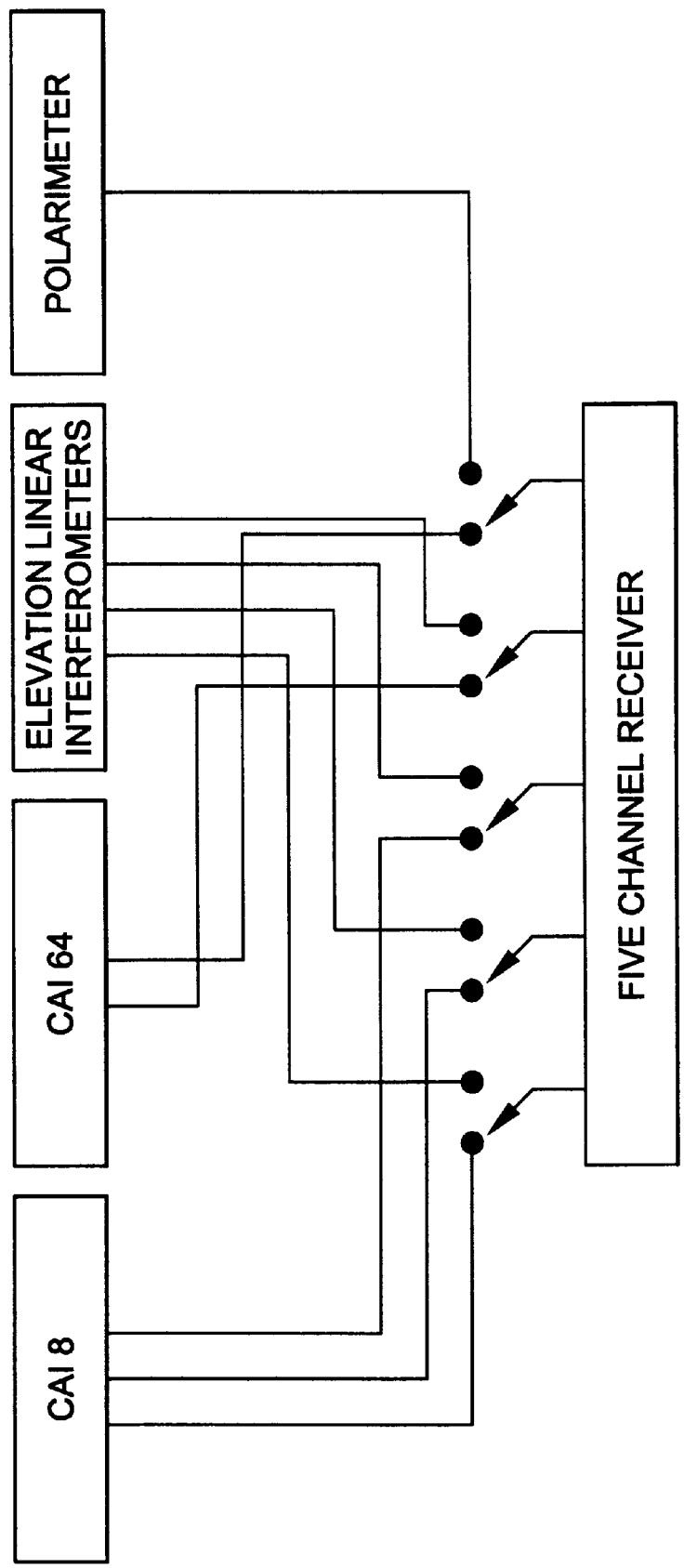
FIG. 17 is a block diagram of an antenna system using the Az/El DF antenna of the present invention and a five channel receiver.

While the Az/El DF antenna system has not been designed with any specific receiver configuration in mind, it is likely that most applications will require as much DF information as possible to be processed in a single pulse. It is also likely that receiver channels will be time-shared to reduce the cost and complexity of the receiver system. Such requirements can be facilitated by the addition of delay lines into the antenna system, so that monopulse DF information from the antenna elements can be processed sequentially. FIG. 17 suggests one concept for sharing a five-channel receiver to make the seven phase comparisons needed for azimuth, elevation and polarization measurements.

Since the CAI-64 50, 58 is inherently eight times more precise than the CAI-8 48, 56 the AOA data is provided with an accuracy on the order of one eighth of a degree in azimuth. Factoring in the improvement in calibration due to elevation and polarization information, AOA accuracy better than 0.1 degree can be expected from the Az/EB DF antenna system.

As previously noted, AOA data from the CAI-64 50, 58 is ambiguous every 11 degrees and must be resolved in the supplementary CAI-8 48, 56. A signal from one particular direction in azimuth will produce a phase reading in the CAI-64 50, 58 which could correspond to any of the 32 azimuth angles, with exactly 11.25 degrees between adjacent angle candidates. If a phase measurement error of 8 degrees (3σ) is assumed, then a 3σ uncertainty of 0.25 degree azimuth (8 degrees de-magnified by a factor of 32) is inherent in this measurement. Thus, the resolving CAI-8 48, 56 is required to provide an unambiguous reading to approximately ±5.375 degrees (half of 11.25, minus 0.25 degree) to avoid choosing an incorrect candidate. For a one-sigma AOA error of 1.0 degree achieved with the CAI, the three-sigma error is only 3.0 degrees, which is well below 5.375. Therefore, the probability of correctly resolving the ambiguity is greater than 99%.

Figure 18:
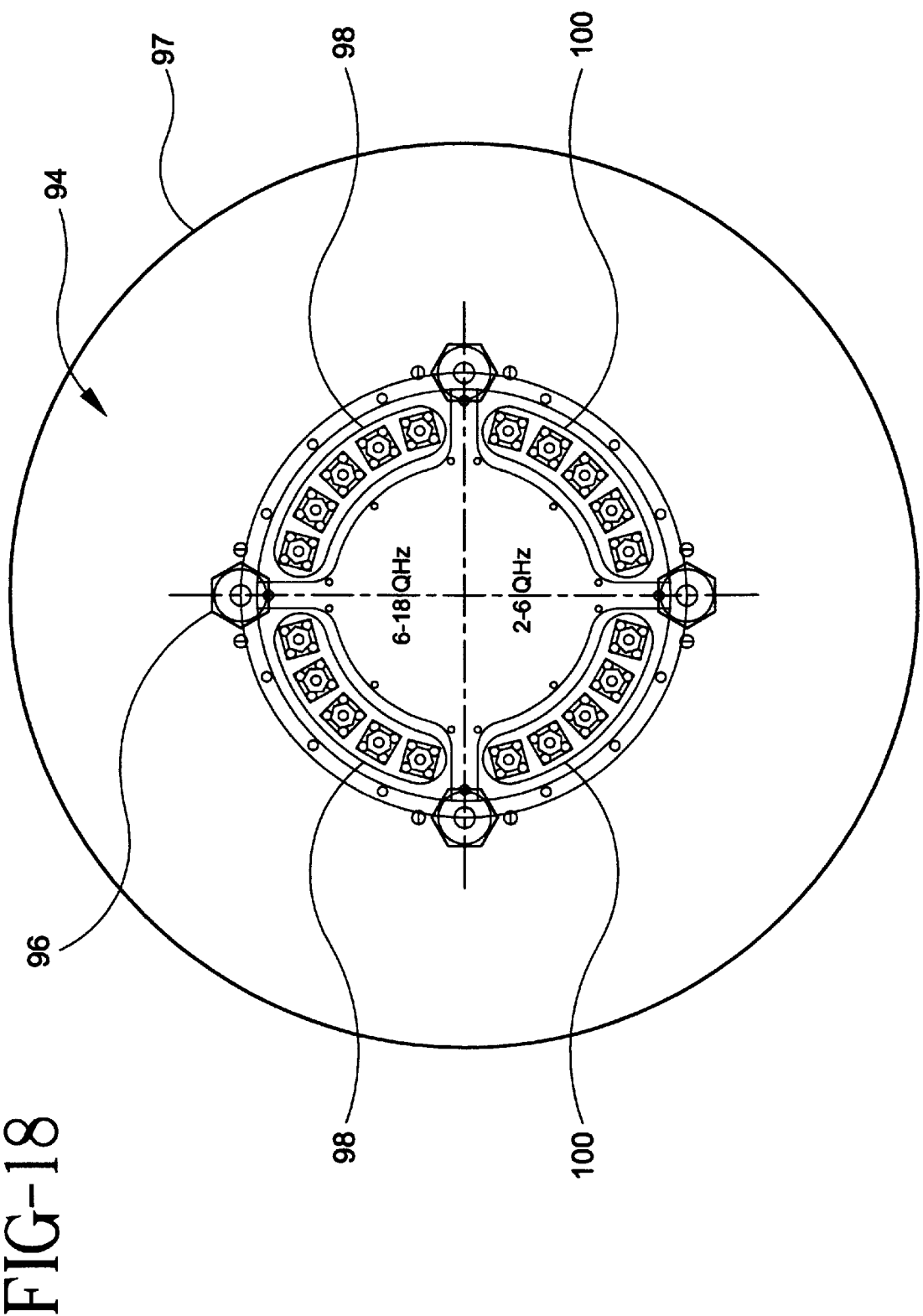
FIG. 18 is a top plan view of a base plate for the Az/El DF antenna of the present invention.

The Az/El DF antenna system can be adapted to a wide range of mounting requirements. For instance, the entire assembly of antenna elements could be mounted onto an integral, central mandrel for rigidity. FIG. 18 illustrates one possible mounting scheme, for the base plate 94 having a circumference 97. Preferably, a mounting ring or palate is used at the base of the system including threaded mounting standoffs 96. A radome (not shown) covering the entire stack could be realized with negligible impact on performance characteristics if the radome includes a multilayer sandwich construction. A conical radome shape reduce cross-section and deters ice build-up on the horizontal CAI-64 surface.

A total of 20 outputs are housed in the base plate 94. Outputs for the upper subband (6–18 GHz) 98 are positioned along the upper portion of the base plate 94 and outputs for the lower subband 100 are positioned along the lower portion of the base plate 94. TNC connectors may be used. Outputs are arranged and labeled for easy access, and the connectors, along with some of the internal electrical connections, are preferably field replaceable.

Figure 19:
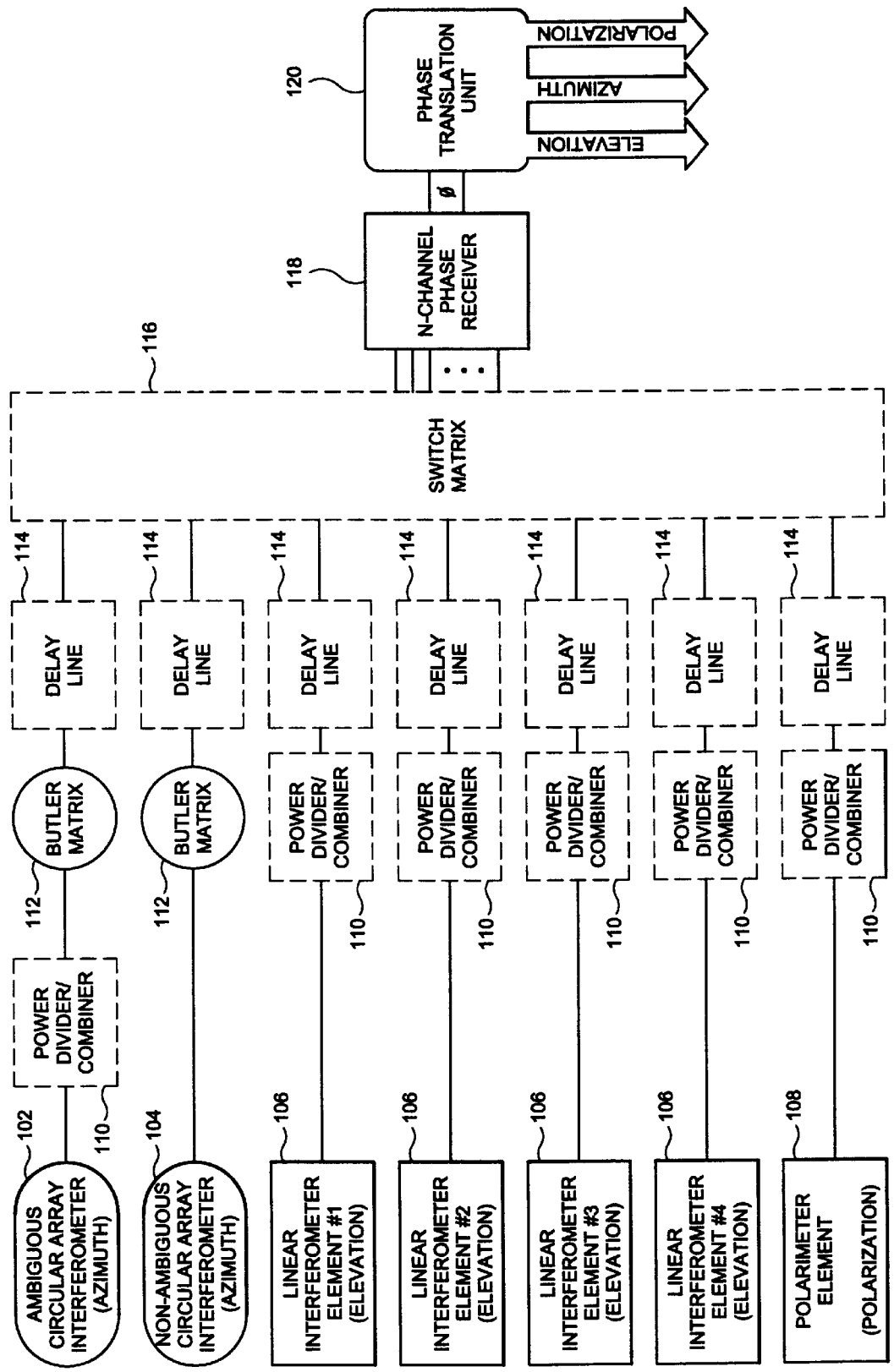
FIG. 19 is a block diagram of an antenna system incorporating the Az/El DF antenna of the present invention.

FIG. 19 illustrates a block diagram of a generic antenna system including the Az/El DF antenna of the present invention. Blocks having dashed lines represent optional elements in the generic antenna system. The antenna system includes an ambiguous CAI 102 (such as the CAI-64), a non-ambiguous CAI 104 (such as the CAI-8), four elevation linear interferometers 106, a polarimeter 108, optional power divider/combiners 110, Butler matrices 112, optional delay lines 114, an optional switch matrix 116, an N-channel phase receiver 118, and a phase translation unit 120. The following enumerated paths are included in the generic antenna system. Each element of each path is coupled to adjacent elements listed in the path, preferably in the order in which the elements are listed.

1. the ambiguous CAI 102, the power divider/combiner 110, the Butler matrix 112, the optional delay lines 114, the optional switch matrix 116, the N-channel phase receiver 118, the phase translation unit 120;

2. the non-ambiguous CAI 104, the Butler matrix 112, the optional delay lines 114, the optional switch matrix 116, the N-channel phase receiver 118, the phase translation unit 120;

3. the four elevation linear interferometer omnidirectional elements 106, the optional delay lines 114, the optional switch matrix 116, the N-channel phase receiver 118, the phase translation unit 120; and 4. the polarimeter 108, the optional delay lines 114, the optional switch matrix 116, the N-channel phase receiver 118, the phase translation unit 120.

The specific configurations for the power divider/combiners 110, Butler matrix 112, delay lines 114, switch matrix 116 and N-channel phase receiver including the quantity of inputs and outputs and the inclusion of optional components will be determined by such variables as the quantity and configuration of antenna elements, AOA accuracy, gain, overall size, total cost and the like. If the linear interferometer elements 106 and/or polarimeter element 108 are each configured as an omnidirectional circular array of sub-elements, or as a partial circular array, then the optional power divider/combiners 110 are preferably present in the configuration. If the linear interferometer elements 106 and/or polarimeter elements are not configured as a circular array, then the power divider/combiners 110 are preferably not present in the configuration. The partial omnidirectional circular array is useful for situations in which there is an obstruction in the field of view. The delay lines 114 permit sequential processing of elevation, polarization and azimuth information without requiring additional redundant channels of the phase receiver 118. The phase translation unit 120 transforms phase difference information from the N-channel phase receiver 118 into elevation, azimuth, or polarization information by means well known in the art such as by use of memory-based lookup tables or microprocessor-based circuits performing phase translation algorithms.

Figure 20:
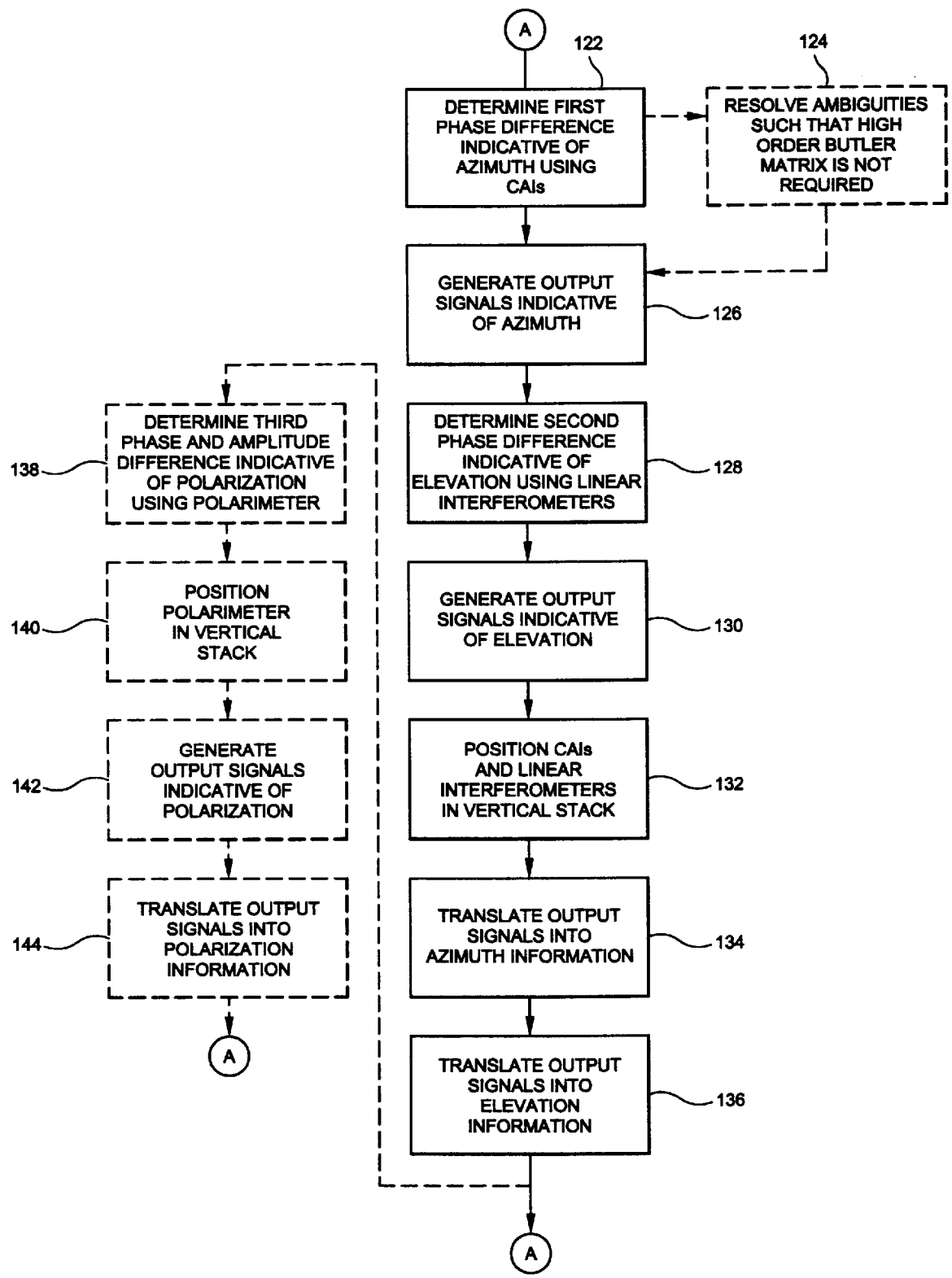
FIG. 20 is a flowchart of a method for determining two-dimensional angle-of-arrival of input signals.

FIG. 20 illustrates a method for determining two-dimensional angle-of-arrival of input signals in accordance with the present invention. Blocks having a dashed line represent optional steps in the method. The method includes the steps of determining first phase differences indicative of azimuth of the input signals using the plurality of circular array interferometers in step 122, generating output signals representative of the first phase difference indicative of azimuth of the input signals in step 126, determining a second phase difference indicative of elevation of the input signals using the plurality of linear interferometers in step 128, generating output signals representative of the second phase difference indicative of elevation of the input signals in step 130, positioning the plurality of circular array interferometers and the plurality of linear interferometers in a substantially vertically stacked orientation such that the azimuth constant-phase-difference contours are substantially orthogonal to the elevation constant-phase-difference contours in step 132, translating the output signals representative of the first phase differences into azimuth information in step 134, and translating the output signals representative of the second phase differences into elevation information in step 136. The plurality of circular array interferometers exhibit azimuth constant-phase-difference contours on the direction sphere and its projections. The plurality of linear interferometers exhibit elevation constant-phase-difference contours on the direction sphere and its projections.

The method illustrated in FIG. 20 optionally includes the steps of determining a third phase difference and amplitude difference indicative of polarization of the input signals using a polarimeter and at least one of the plurality of linear interferometers in step 138, positioning the polarimeter in the substantially vertically stacked orientation with the plurality of circular array interferometers and the plurality of linear interferometers in step 140, generating output signals representative of the third phase difference and amplitude difference indicative of polarization of the input signal in step 142, translating the output signal representative of the third phase difference and amplitude difference into polarization information in step 144, and resolving ambiguities generated by at least one of the plurality of circular array interferometers using at least one other of the plurality of circular array interferometers such that a high order Butler matrix is not required to generate omnidirectional phase modes from the at least one of the plurality of circular array interferometers in step 124.

Figure 21:
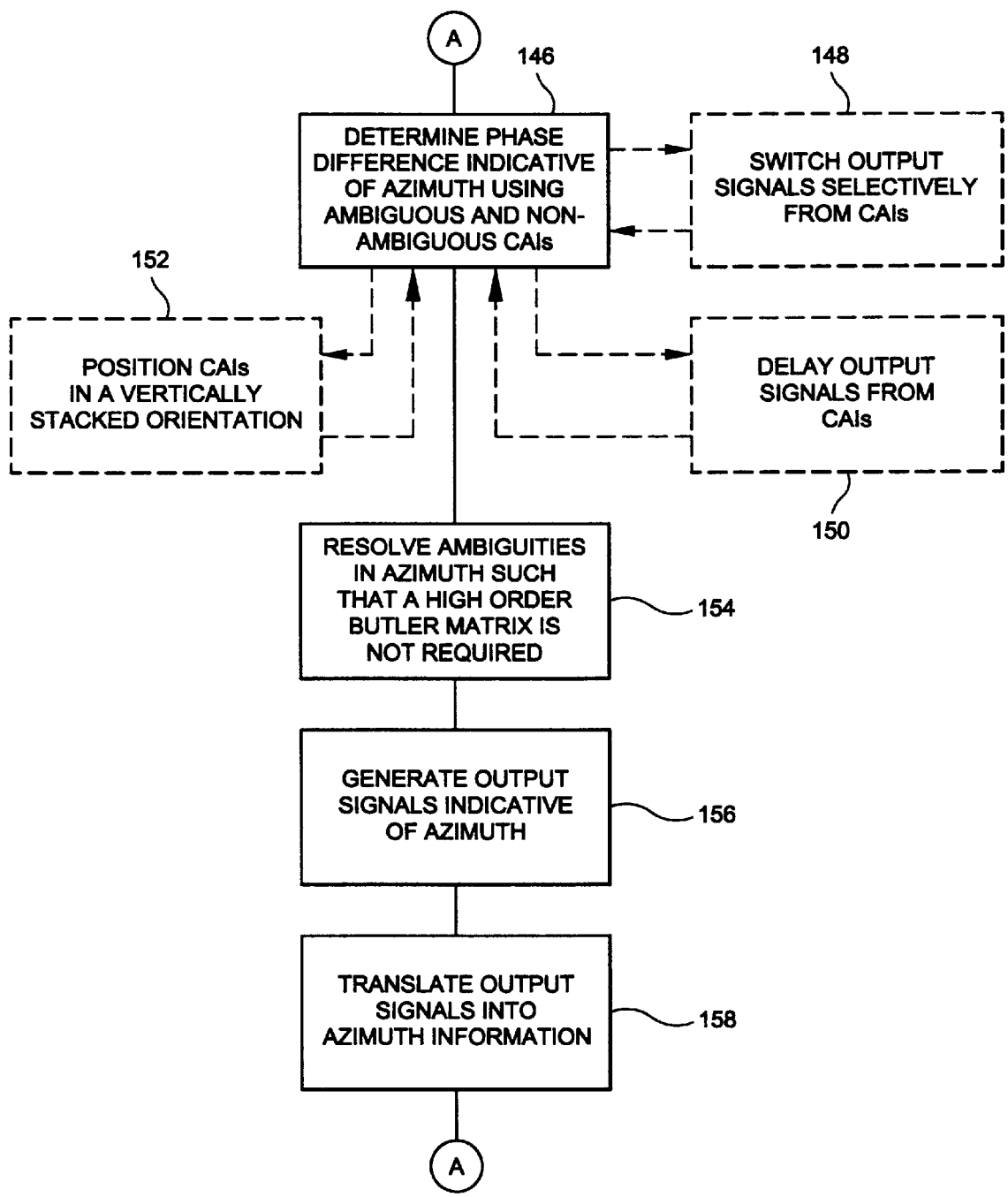
FIG. 21 is a flowchart of a method for determining azimuth of input signals.

FIG. 21 illustrates a method for determining azimuth of input signals, which includes the steps of determining a phase difference indicative of azimuth of the input signals using a plurality of circular array interferometers comprising at least one ambiguous circular array interferometer and at least one non-ambiguous circular array interferometer in step 146, resolving ambiguities in azimuth as indicated by the phase difference of the input signals determined by the ambiguous circular array interferometer using the non-ambiguous circular array interferometer such that a high order Butler matrix is not required to generate omnidirectional phase modes from the ambiguous circular array interferometer in step 154, generating output signals representative of phase difference indicative of azimuth of the input signal in step 156, and translating the phase difference indicative of azimuth of the input signals into azimuth information in step 158.

The method illustrated in FIG. 21 can optionally include switching output signals selectively from the plurality of circular array interferometers to the N-channel phase receiver in step 148, delaying output signals from the plurality of circular array interferometers prior to the N-channel phase receiver in step 150, and positioning the plurality of circular array interferometers in a substantially vertically stacked orientation in step 152.

The elevation linear interferometer is novel due to its omnidirectional antenna pattern, among other reasons. The azimuth interferometer is unique for many reasons including because the CAI-64/ CAI-8 configuration eliminates the need for a high-order Butler matrix. The polarimeter is unique for many reasons, one of which is that it requires only one additional linear interferometer to serve as the reference. Together, the Az/E1 DF antenna system is advantageous because it provides a DF system, which substantially decouples measurement of azimuth and elevation, thus simplifying calibration and signal processing. The Az/E1 DF antenna system of the present invention also requires fewer phase difference measurements than alternative systems having equivalent coverage, and can be packaged in a smaller volume.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. An antenna for determining two-dimensional angle-of-arrival of input signals, which comprises:
   a plurality of circular array interferometers for determining azimuth of the input signals, the plurality of circular array interferometers exhibiting azimuth constant-phase-difference contours on a projection of a direction hemisphere, the plurality of circular array interferometers generating output signals in response to the input signals, each of the plurality of circular array interferometers having an axis;
   a plurality of linear interferometers for determining elevation of the input signals, the plurality of linear interferometers exhibiting elevation constant-phase-difference contours on the projection of the direction hemisphere, the plurality of linear array interferometers generating output signals in response to the input signals, each of the plurality of linear interferometers having an axis, each of the axes of the plurality of circular array interferometers being substantially parallel to each of the axes of the plurality of linear interferometers, the azimuth constant-phase-difference contours being substantially orthogonal to the elevation constant-phase-difference contours.

2. An antenna for determining two-dimensional angle-of-arrival of input signals as defined by claim 1, the plurality of circular array interferometers and the plurality of linear interferometers being positioned in a substantially vertically stacked orientation.

3. An antenna for determining two-dimensional angle-of-arrival of input signals as defined by claim 1, wherein the plurality of circular array interferometers comprises at least one ambiguous circular array interferometer and at least one non-ambiguous circular array interferometer.

4. An antenna for determining two-dimensional angle-of-arrival of input signals as defined by claim 2, wherein the at least one ambiguous circular array interferometer is situated coaxially to the at least one non-ambiguous circular array interferometer.

5. An antenna for determining two-dimensional angle-of-arrival of input signals as defined by claim 3, wherein the at least one non-ambiguous circular array interferometer resolves ambiguities in azimuth as indicated by a phase difference of the input signals determined by the at least one ambiguous circular array interferometer, the at least one ambiguous circular array interferometer being operatively coupled to a first Butler matrix and a power divider/combiner, thereby removing the need for a second Butler matrix to generate high-order omnidirectional phase modes, the second Butler matrix having a greater number of inputs and outputs than the first Butler matrix.

6. An antenna for determining two-dimensional angle-of-arrival of input signals as defined by claim 1, wherein the plurality of linear interferometers comprises a double dual-level linear interferometer.

7. An antenna for determining two-dimensional angle-of-arrival of input signals as defined by claim 1, wherein the plurality of linear interferometers are substantially omnidirectional.

8. An antenna for determining two-dimensional angle-of-arrival of input signals as defined by claim 1, wherein the plurality of circular array interferometers are substantially omnidirectional.

9. An antenna for determining two-dimensional angle-of-arrival of input signals as defined by claim 1, further comprising a polarimeter for determining polarity of the input signal, the polarimeter being positioned in the substantially vertically stacked orientation with the plurality of circular array interferometers and the plurality of linear interferometers.

10. An antenna for determining two-dimensional angle-of-arrival of input signals as defined by claim 9, wherein the polarimeter is substantially cross-polarized with the plurality of linear interferometers and the plurality of circular array interferometers.

11. An antenna for determining two-dimensional angle-of-arrival of input signals as defined by claim 1, wherein the plurality of linear interferometers and the plurality of circular array interferometers are substantially copolarized.

12. An antenna for determining two-dimensional angle-of-arrival of input signals as defined by claim 1, further comprising a low subband antenna and a high subband antenna, the low subband antenna comprising at least one of the plurality of linear interferometers and at least one of the plurality of circular array interferometers, the high subband antenna comprising at least one of the plurality of linear interferometers and at least one of the plurality of circular array interferometers, the high subband antenna being substantially interleaved with the low subband antenna.

13. An antenna for determining two-dimensional angle-of-arrival of input signals as defined by claim 1, wherein the plurality of linear interferometers are fed with a ring array which provides a control conduit for feeding the plurality of circular array interferometers and the plurality of linear interferometers.

14. An antenna for determining two-dimensional angle-of-arrival of input signals as defined by claim 1, wherein the plurality of circular array interferometers are fed with a ring array which provides a control conduit for feeding the plurality of circular array interferometers and the plurality of linear interferometers.

15. An antenna for determining two-dimensional angle-of-arrival of input signals as defined by claim 1, further comprising means for positioning the plurality of circular array interferometers and plurality of linear interferometers in a substantially vertically stacked orientation.

16. An antenna for determining two-dimensional angle-of-arrival of input signals as defined by claim 15, wherein the means for positioning the plurality of circular array interferometers and plurality of linear interferometers in a substantially vertically stacked orientation includes a substantially hollow mast which functions as a conduit for feeding the plurality of circular array interferometers and the plurality of linear interferometers.

17. A system for determining two-dimensional angle-of-arrival of input signals, which comprises:
   1) an antenna comprising
      a) a plurality of circular array interferometers for determining azimuth of the input signals, the plurality of circular array interferometers exhibiting azimuth constant-phase-difference contours on a projection of a direction hemisphere, the plurality of circular array interferometers generating output signals in response to the input signals, each of the plurality of circular array interferometers having an axis, and
      b) a plurality of linear interferometers for determining elevation of the input signal, the plurality of linear interferometers exhibiting elevation constant-phase-difference contours on the projection of the direction hemisphere, the plurality of linear interferometers generating output signals in response to the input signals, the plurality of circular array interferometers and the plurality of linear interferometers being positioned in a substantially vertically stacked orientation, each of the plurality of linear interferometers having an axis, each of the axes of the plurality of circular array interferometers being substantially parallel to each of the axes of the plurality of linear interferometers, the azimuth constant-phase-difference contours being substantially orthogonal to the elevation constant-phase-difference contours;
   2) at least one Butler matrix for generating omnidirectional phase modes from the output signals from each of the plurality of circular array interferometers, the at least one Butler matrix responsive to the output signals from each of the plurality of circular array interferometers;
   3) an N-channel phase receiver for determining phase difference between output signals from the plurality of linear interferometers and phase difference between the phase modes, the azimuth of the input signals being a function of the phase difference between phase modes from the at lease one Butler matrix, the elevation of the input signals being a function of the phase difference between output signals from the plurality of linear interferometers;
   4) a first translation circuit which converts the phase difference between the phase modes into azimuth information; and
   5) a second translation circuit which converts the phase difference between output signals from the plurality of linear interferometers into elevation information.

18. A system for determining two-dimensional angle-of-arrival of input signals as defined by claim 17, further comprising a polarimeter for determining polarization of the input signals, and wherein the N-channel phase receiver determines phase and amplitude difference between output signals from the polarimeter and at least one of the plurality of linear interferometers, and wherein the system further comprises a third translation circuit which converts the phase difference and amplitude difference between output signals from the polarimeter and at least one of the plurality of linear interferometers into polarization information.

19. A system for determining two-dimensional angle-of-arrival of input signals as defined by claim 18, further comprising a delay line delaying output signals from the polarimeter prior to the N-channel phase receiver.

20. A system for determining two-dimensional angle-of-arrival of input signals as defined by claim 18, further comprising switches selectively routing output signals from the polarimeter to the N-channel phase receiver.

21. A system for determining two-dimensional angle-of-arrival of input signals as defined by claim 17, further comprising switches selectively routing output signals from the linear interferometers to the N-channel phase receiver.

22. A system for determining two-dimensional angle-of-arrival of input signals as defined by claim 17, further comprising switches selectively routing output signals from the plurality of circular array interferometers to the N-channel phase receiver.

23. A system for determining two-dimensional angle-of-arrival of input signals as defined by claim 17, further comprising a delay line delaying output signals from the plurality of circular array interferometers.

24. A system for determining two-dimensional angle-of-arrival of input signals as defined by claim 17, further comprising a delay line delaying output signals from the plurality of linear interferometers.

25. A system for determining two-dimensional angle-of-arrival of input signals as defined by claim 17, wherein the plurality of circular array interferometers comprise at least one ambiguous circular array interferometer and at least one non-ambiguous circular array interferometer.

26. A system for determining two-dimensional angle-of-arrival of input signals, as defined by claim 25, wherein the at least one non-ambiguous circular array interferometer resolves ambiguities in azimuth as indicated by a phase difference of the input signals determined by the at least one ambiguous circular array interferometer, the at least one ambiguous circular array interferometer being operatively coupled to a first Butler matrix and a power divider/combiner, thereby removing the need for a second Butler matrix to generate high-order omnidirectional phase modes, the second Butler matrix having a greater number of inputs and outputs than the first Butler matrix.

27. A system for determining two-dimensional angle-of-arrival of input signals as defined by claim 25, further comprising a power divider/combiner situated electronically between the at least one ambiguous circular array interferometer and a low-order Butler matrix, the power divider/combiner being responsive to output signals from the at least one ambiguous circular array interferometers.

28. An antenna for determining azimuth of input signals, which comprises:
   a plurality of circular array interferometers comprising at least one ambiguous circular array interferometer and at least one non-ambiguous circular array interferometer, the ambiguous circular array interferometer comprising a first plurality of antenna elements, the non-ambiguous circular array interferometer comprising a second plurality of antenna elements, the non-ambiguous circular array interferometer resolving ambiguities in azimuth as indicated by a phase difference of the input signals determined by the ambiguous circular array interferometer, the at least one ambiguous circular array interferometer being operatively coupled to a first Butler matrix and a power divider/combiner, thereby removing the need for a second Butler matrix to generate high-order omnidirectional phase modes, the second Butler matrix having a greater number of inputs and outputs than the first Butler matrix.

29. A system for determining azimuth of input signals as defined by claim 28, wherein the plurality of circular array interferometers are positioned in a substantially vertically stacked orientation.

30. A system for determining azimuth of input signals as defined by claim 28, wherein the second plurality of antenna elements is less in number than the first plurality of antenna elements.

31. A system for determining azimuth of input signals, which comprises:
   an antenna comprising a plurality of circular array interferometers comprising at least one ambiguous circular array interferometer and at least one non-ambiguous circular array interferometer, the ambiguous circular array interferometer comprising a first plurality of antenna elements, the non-ambiguous circular array interferometer comprising a second plurality of antenna elements, the non-ambiguous circular array interferometer resolving ambiguities in azimuth as defined by a phase difference of the input signals determined by the ambiguous circular array interferometer, the at least one ambiguous circular array interferometer being operatively coupled to a at least one first Butler matrix and a power divider/combiner, thereby removing the need for a second Butler matrix to generate high-order omnidirectional phase modes, the second Butler matrix having a greater number of inputs and outputs than the at least one first Butler matrix;
   the at least one first Butler matrix for generating omnidirectional phase modes from the output signals from each of the plurality of circular array interferometers, the at least one first Butler matrix being responsive to the output signals from each of the plurality of circular array interferometers;
   an N-channel phase receiver for determining phase differences between the phase modes, the azimuth of the input signals being a function of the phase difference between phase modes from the at least one third Butler matrix; and
   a translation circuit that converts the phase difference between the phase modes into azimuth information.

32. A system for determining two-dimensional angle-of-arrival of input signals as defined by claim 31, further comprising switches selectively routing output signals from the plurality of circular array interferometers to the N-channel phase receiver.

33. A system for determining two-dimensional angle-of-arrival of input signals as defined by claim 31, further comprising a delay line delaying output signals from the plurality of circular array interferometers prior to the N-channel phase receiver.

34. A system for determining two-dimensional angle-of-arrival of input signals as defined by claim 31, further comprising a power divider/combiner situated electronically between the at least one ambiguous circular array interferometer and a low-order Butler matrix, the power divider/combiner responsive to output signals from the at least one ambiguous circular array interferometers.

35. A system for determining two-dimensional angle-of-arrival of input signals as defined by claim 31, wherein the second plurality of antenna elements is less in number than the first plurality of antenna elements.

36. A system for determining two-dimensional angle-of-arrival of input signals as defined by claim 31, the plurality of circular array interferometers being positioned in a substantially vertically stacked orientation.

37. A method for determining phase differences indicative of two-dimensional angle-of-arrival of input signals, which comprises the steps of:
   determining a first phase difference indicative of azimuth of the input signals using a plurality of circular array interferometers, the plurality of circular array interferometers exhibiting azimuth constant-phase-difference contours on a projection of a direction hemisphere, each of the plurality of circular array interferometers having an axis;
   generating output signals representative of the first phase difference indicative of azimuth of the input signals;
   determining a second phase difference indicative of elevation of the input signals using a plurality of linear interferometers, the plurality of linear interferometers exhibiting elevation constant-phase-difference contours on the projection of the direction hemisphere, each of the plurality of linear interferometers having an axis, each of the axes of the plurality of circular array interferometers being substantially parallel to each of the axes of the plurality of linear interferometers;
   generating output signals representative of the second phase difference indicative of elevation of the input signals; and
   positioning the plurality of circular array interferometers and the plurality of linear interferometers in a substantially vertically stacked orientation such that the azimuth constant-phase-difference contours are substantially orthogonal to the elevation constant-phase-difference contours.

38. A method for determining phase differences indicative of two-dimensional angle-of-arrival of input signals as defined by claim 37, further comprising the step of resolving ambiguities generated by at least one of the plurality of circular array interferometers, the at least one ambiguous circular array interferometer being operatively coupled to a first Butler matrix and a power divider/combiner, thereby removing the need for a second Butler matrix to generate high-order omnidirectional phase modes, the second Butler matrix having a greater number of inputs and outputs than the first Butler matrix.

39. A method for determining phase differences indicative of two-dimensional angle-of-arrival of input signals as defined by claim 37, further comprising the steps of determining a third phase difference and an amplitude difference indicative of the polarization of the input signal using a polarimeter and positioning the polarimeter in the substantially vertically stacked orientation with the plurality of circular array interferometers and the plurality of linear interferometers.

40. A method for determining phase differences indicative of two-dimensional angle-of-arrival of input signals as defined by claim 39, further comprising the step of cross-polarizing the polarimeter with the plurality of linear interferometers and the plurality of circular array interferometers.

41. A method for determining phase differences indicative of two-dimensional angle-of-arrival of input signals as defined by claim 37, further comprising the step of copolarizing the plurality of linear interferometers and the plurality of circular array interferometers.

42. A method for determining two-dimensional angle-of-arrival of input signals, which comprises the steps of:
   determining a first phase difference indicative of azimuth of the input signals using a plurality of circular array interferometers, the plurality of circular array interferometers exhibiting azimuth constant-phase-difference contours on a projection of a direction hemisphere, each of the plurality of circular array interferometers having an axis;

generating output signals representative of the first phase difference indicative of azimuth of the input signals;

determining a second phase difference indicative of elevation of the input signals using a plurality of linear interferometers, the plurality of linear interferometers exhibiting elevation constant-phase-difference contours on the projection of the direction hemisphere, each of the plurality of linear interferometers having an axis, each of the axes of the plurality of circular array interferometers being substantially parallel to each of the axes of the plurality of linear interferometers;

generating output signals representative of the second phase difference indicative of elevation of the input signals;

orienting the plurality of circular array interferometers and the plurality of linear interferometers such that the azimuth constant-phase-difference contours are substantially orthogonal to the elevation constant-phase-difference contours;

translating the output signals representative of the first phase difference into azimuth information; and translating the output signals representative of the second phase difference into elevation information.

43. A method for determining two-dimensional angle-of-arrival of input signals as defined by claim 42, further comprising the steps of determining a third phase difference and amplitude difference indicative of polarization of the input signals using a polarimeter and at least one of the plurality of linear interferometers, positioning the polarimeter in the substantially vertically stacked orientation with the plurality of circular array interferometers and the plurality of linear interferometers, generating output signals representative of the third phase difference and amplitude difference indicative of elevation of the input signal, and translating the output signal representative of the third phase difference and amplitude difference into polarization information.

44. A method for determining phase differences indicative of two-dimensional angle-of-arrival of input signals as defined by claim 42, further comprising the step of resolving ambiguities generated by at least one of the plurality of circular array interferometers, the at least one ambiguous circular array interferometer being operatively coupled to a first Butler matrix and a power divider/combiner, thereby removing the need for a second Butler matrix to generate high-order omnidirectional phase modes, the second Butler matrix having a greater number of inputs and outputs than the first Butler matrix.

45. A method for determining phase difference representative of azimuth of input signals, which comprises the steps of:

determining a phase difference indicative of azimuth of the input signals using a plurality of circular array interferometers comprising at least one ambiguous circular array interferometer and at least one non-ambiguous circular array interferometer; and resolving ambiguities in azimuth as indicated by the phase difference of the input signals determined by the ambiguous circular array interferometer using the non-ambiguous circular array interferometer, the at least one non-ambiguous circular array interferometer being operatively coupled to the at least one ambiguous circular array interferometer, a first Butler matrix and a power divider/combiner, thereby removing the need for a second Butler matrix to generate high-order omnidirectional phase modes, the second Butler matrix having a greater number of inputs and outputs than the first Butler matrix.

46. A method for determining phase difference representative of azimuth of input signals as defined by claim 45, further comprising the step of positioning the plurality of circular array interferometers in a substantially vertically stacked orientation.

47. A method for determining phase difference representative of azimuth of input signals as defined by claim 45, further comprising the step of positioning the plurality of circular array interferometers and the plurality of linear interferometers in a substantially vertically stacked orientation.

48. A method for determining azimuth of input signals, which comprises the steps of:

determining a phase difference indicative of azimuth of the input signals using a plurality of circular array interferometers comprising at least one ambiguous circular array interferometer and at least one non-ambiguous circular array interferometer;

resolving ambiguities in azimuth as indicated by the phase difference of the input signals determined by the ambiguous circular array interferometer using the non-ambiguous circular array interferometer, the at least one ambiguous circular array interferometer being operatively coupled to a first Butler matrix and a power divider/combiner, thereby removing the need for a second Butler matrix to generate high-order omnidirectional phase modes, the second Butler matrix having a greater number of inputs and outputs than the first Butler matrix;

generating output signals representative of phase difference indicative of azimuth of the input signal; and translating the phase difference indicative of azimuth of the input signals into azimuth information.

49. A method for determining azimuth of input signals as defined by claim 48, further comprising the step of switching output signals selectively from the plurality of circular array interferometers to the N-channel phase receiver.

50. A method for determining azimuth of input signals as defined by claim 48, further comprising the step of delaying output signals from the plurality of circular array interferometers prior to the N-channel phase receiver.

51. A method for determining azimuth of input signals as defined by claim 48, further comprising the step of positioning the plurality of circular array interferometers in a substantially vertically stacked orientation.

* * * * *